United States Patent [19]

Genna

[11] Patent Number: 5,587,698
[45] Date of Patent: Dec. 24, 1996

[54] AUTOMATIC TIRE PRESSURE CONTROL SYSTEM FOR A VEHICLE

[76] Inventor: Robert A. Genna, 4 Talbot La., Greenwich, Conn. 06830

[21] Appl. No.: 395,969

[22] Filed: Feb. 28, 1995

Related U.S. Application Data

[63] Continuation-in-part of Ser. No. 831,187, Feb. 5, 1992, abandoned.

[51] Int. Cl.$^6$ .................................................. B60C 23/00
[52] U.S. Cl. .................. 340/442; 152/417; 73/146.5; 116/34 R; 200/61.22; 303/85
[58] Field of Search ............................. 340/442; 152/415, 152/416, 417; 73/146.5; 116/34 R; 200/61.22; 303/85, 80, 83

[56] References Cited

U.S. PATENT DOCUMENTS

| | | | |
|---|---|---|---|
| 3,927,708 | 12/1975 | Hulme | 152/418 |
| 4,431,043 | 2/1984 | Goodell et al. | 152/417 |
| 4,583,566 | 4/1986 | Kalavitz et al. | 137/101.19 |
| 4,598,750 | 7/1986 | Gant | 152/416 |
| 4,640,331 | 2/1987 | Braun et al. | 152/417 |
| 4,641,698 | 2/1987 | Bitonti | 152/416 |
| 4,742,857 | 5/1988 | Gandhi | 152/418 |
| 4,763,709 | 8/1988 | Scholer | 152/416 |
| 4,805,681 | 2/1989 | Vollmer et al. | 152/417 |
| 4,895,199 | 1/1990 | Magnuson et al. | 152/415 |
| 4,922,946 | 5/1990 | Boulicault | 137/102 |
| 5,080,156 | 1/1992 | Bartos | 152/417 |

Primary Examiner—Brent A. Swarthout
Assistant Examiner—Nina Tong
Attorney, Agent, or Firm—St. Onge Steward Johnston & Reens

[57] ABSTRACT

An Automatic Tire Pressure Control System (APS) compensates for fluctuations in the air pressure and temperature of vehicle tires and automatically adjusts the tire pressure. This provides the vehicle operator with a convenient means to automatically regulate the pressure of a vehicles' tires for optimum safety and performance. The system provides nonwearing ferrofluid seals for zero air leakage and a special axle sleeve with multiple air channels for reduced inflation time and an air flow path that is isolated from lubricants, an air compressor powered by a vehicle engine and a microprocessor controlled distributor which distributes air to each tire, depending on a tire pressure and temperature sensor signalling air and temperature requirements. A tire venting system is also provided.

6 Claims, 18 Drawing Sheets

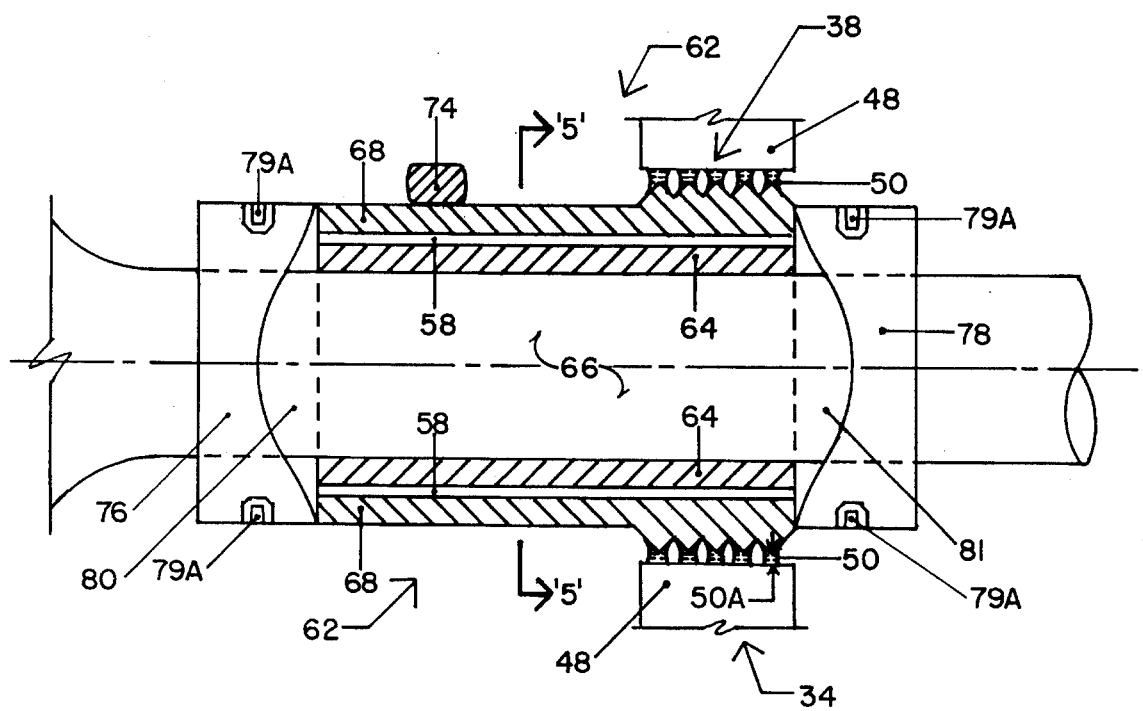
FIG. 4
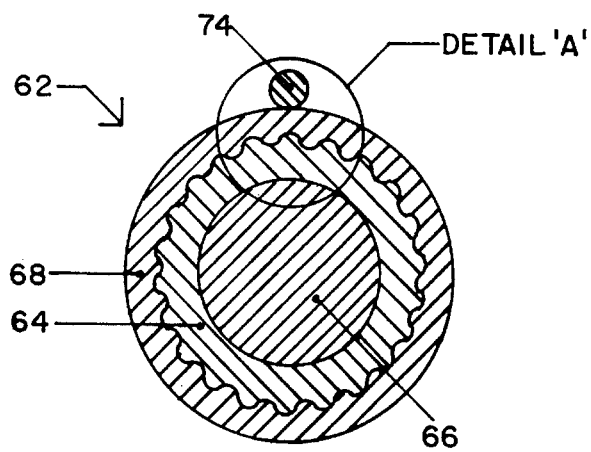
FIG. 5 (SECTION '5'-'5')

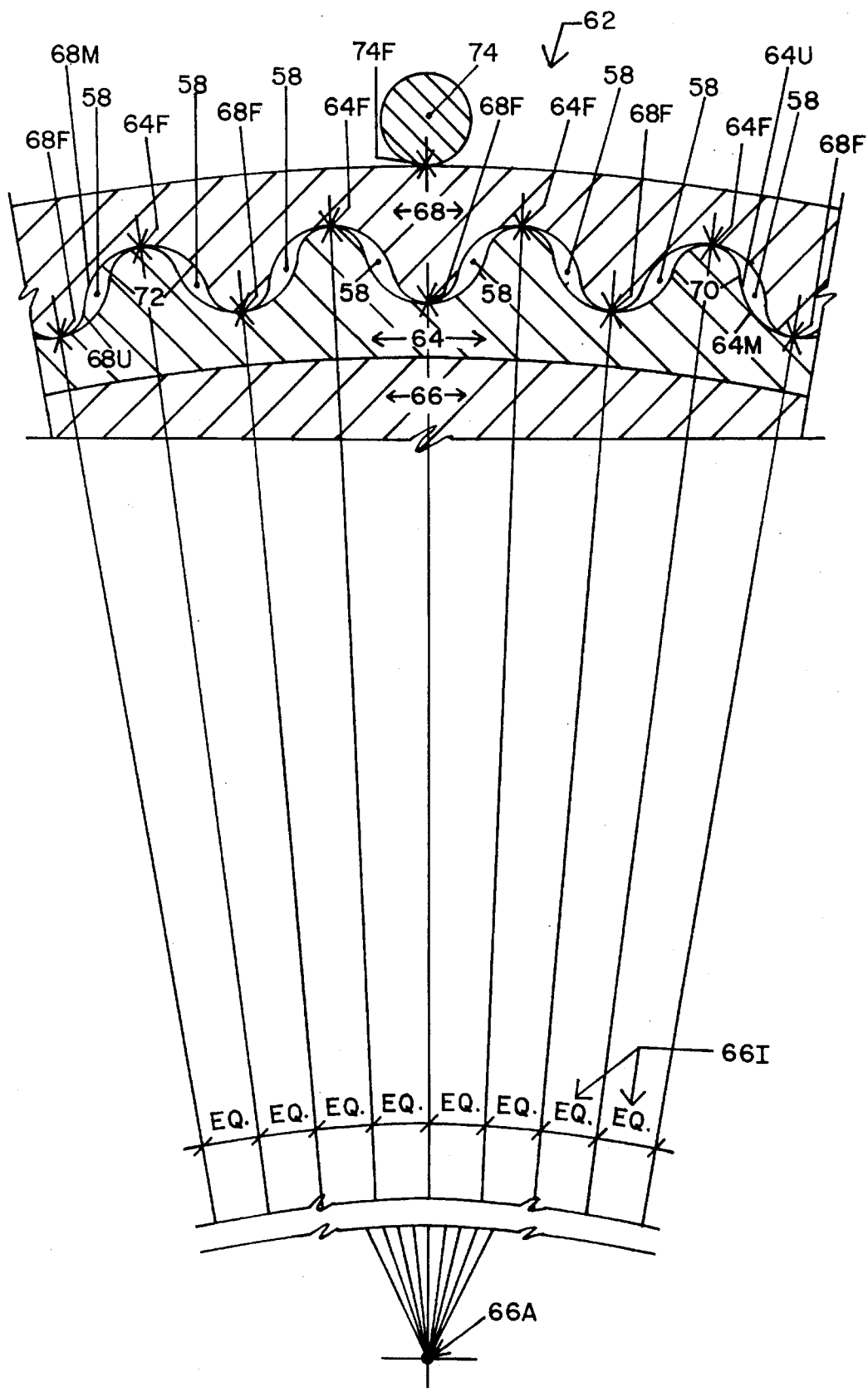
FIG. 6 (DETAIL 'A')

Figure 12A:
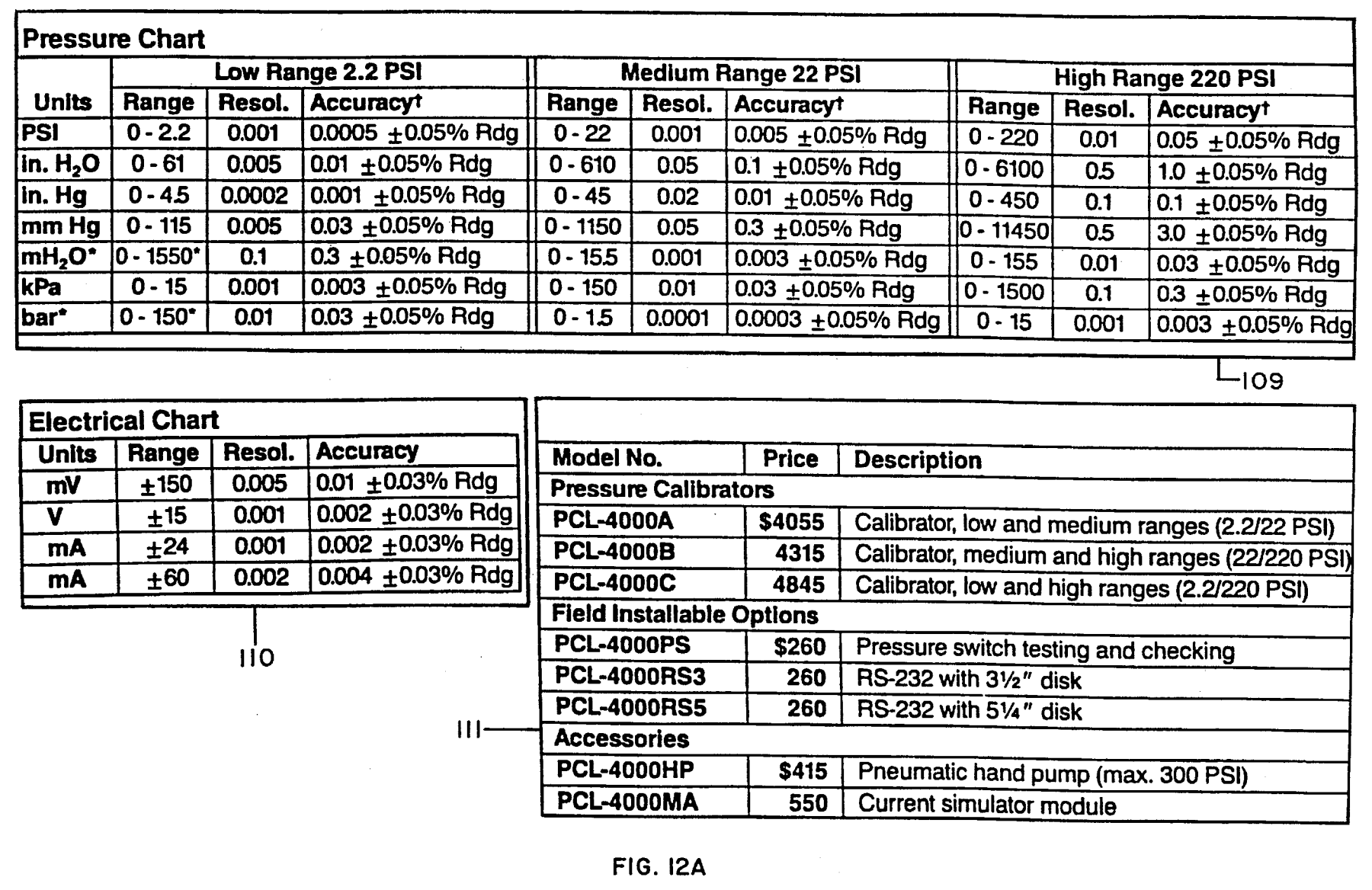

Pressure Chart

| Units | Low Range 2.2 PSI | | | Medium Range 22 PSI | | | High Range 220 PSI | | |
|---|---|---|---|---|---|---|---|---|---|
| | Range | Resol. | Accuracy† | Range | Resol. | Accuracy† | Range | Resol. | Accuracy† |
| PSI | 0 - 2.2 | 0.001 | 0.0005 ±0.05% Rdg | 0 - 22 | 0.001 | 0.005 ±0.05% Rdg | 0 - 220 | 0.01 | 0.05 ±0.05% Rdg |
| in. H₂O | 0 - 61 | 0.005 | 0.01 ±0.05% Rdg | 0 - 610 | 0.05 | 0.1 ±0.05% Rdg | 0 - 6100 | 0.5 | 1.0 ±0.05% Rdg |
| in. Hg | 0 - 4.5 | 0.0002 | 0.001 ±0.05% Rdg | 0 - 45 | 0.02 | 0.01 ±0.05% Rdg | 0 - 450 | 0.1 | 0.1 ±0.05% Rdg |
| mm Hg | 0 - 115 | 0.005 | 0.03 ±0.05% Rdg | 0 - 1150 | 0.05 | 0.3 ±0.05% Rdg | 0 - 11450 | 0.5 | 3.0 ±0.05% Rdg |
| mH₂O* | 0 - 1550* | 0.1 | 0.3 ±0.05% Rdg | 0 - 15.5 | 0.001 | 0.003 ±0.05% Rdg | 0 - 155 | 0.01 | 0.03 ±0.05% Rdg |
| kPa | 0 - 15 | 0.001 | 0.003 ±0.05% Rdg | 0 - 150 | 0.01 | 0.03 ±0.05% Rdg | 0 - 1500 | 0.1 | 0.3 ±0.05% Rdg |
| bar* | 0 - 150* | 0.01 | 0.03 ±0.05% Rdg | 0 - 1.5 | 0.0001 | 0.0003 ±0.05% Rdg | 0 - 15 | 0.001 | 0.003 ±0.05% Rdg |

—109

Electrical Chart

| Units | Range | Resol. | Accuracy |
|---|---|---|---|
| mV | ±150 | 0.005 | 0.01 ±0.03% Rdg |
| V | ±15 | 0.001 | 0.002 ±0.03% Rdg |
| mA | ±24 | 0.001 | 0.002 ±0.03% Rdg |
| mA | ±60 | 0.002 | 0.004 ±0.03% Rdg |

—110

| Model No. | Price | Description |
|---|---|---|
| Pressure Calibrators | | |
| PCL-4000A | $4055 | Calibrator, low and medium ranges (2.2/22 PSI) |
| PCL-4000B | 4315 | Calibrator, medium and high ranges (22/220 PSI) |
| PCL-4000C | 4845 | Calibrator, low and high ranges (2.2/220 PSI) |
| Field Installable Options | | |
| PCL-4000PS | $260 | Pressure switch testing and checking |
| PCL-4000RS3 | 260 | RS-232 with 3½" disk |
| PCL-4000RS5 | 260 | RS-232 with 5¼" disk |
| Accessories | | |
| PCL-4000HP | $415 | Pneumatic hand pump (max. 300 PSI) |
| PCL-4000MA | 550 | Current simulator module |

Input/Output Ranges for CL521/CL521D

| Calibration Type | Range °F | Range °C |
|---|---|---|
| J Iron-Constantan | −346 to 2192 | −210 to 1200 |
| K Cromega™-Alomega™ | −427 to 2501 | −255 to 1372 |
| T Copper-Constantan | −427 to 752 | −255 to 400 |
| E Cromega-Constantan | −437 to 1832 | −260 to 1000 |
| R Pt/13%Rh-Pt | −58 to 3214 | −50 to 1768 |
| S Pt/10%Rh-Pt | −58 to 3200 | −50 to 1760 |
| B Pt/30%Rh-Pt/6%Rh | 752 to 3308 | 400 to 1820 |
| N OMEGALLOY® (Nicrosil-Nisil) | 32 to 2372 | 0 to 1300 |
| J DIN | −328 to 1652 | −200 to 900 |
| T DIN | −328 to 752 | −200 to 400 |
| RTD* | −328 to 2192 | −200 to 1200 |
| mV | −10 to 110 mV | |
| ohms | 0 to 400 ohms | |

FIG. 13A

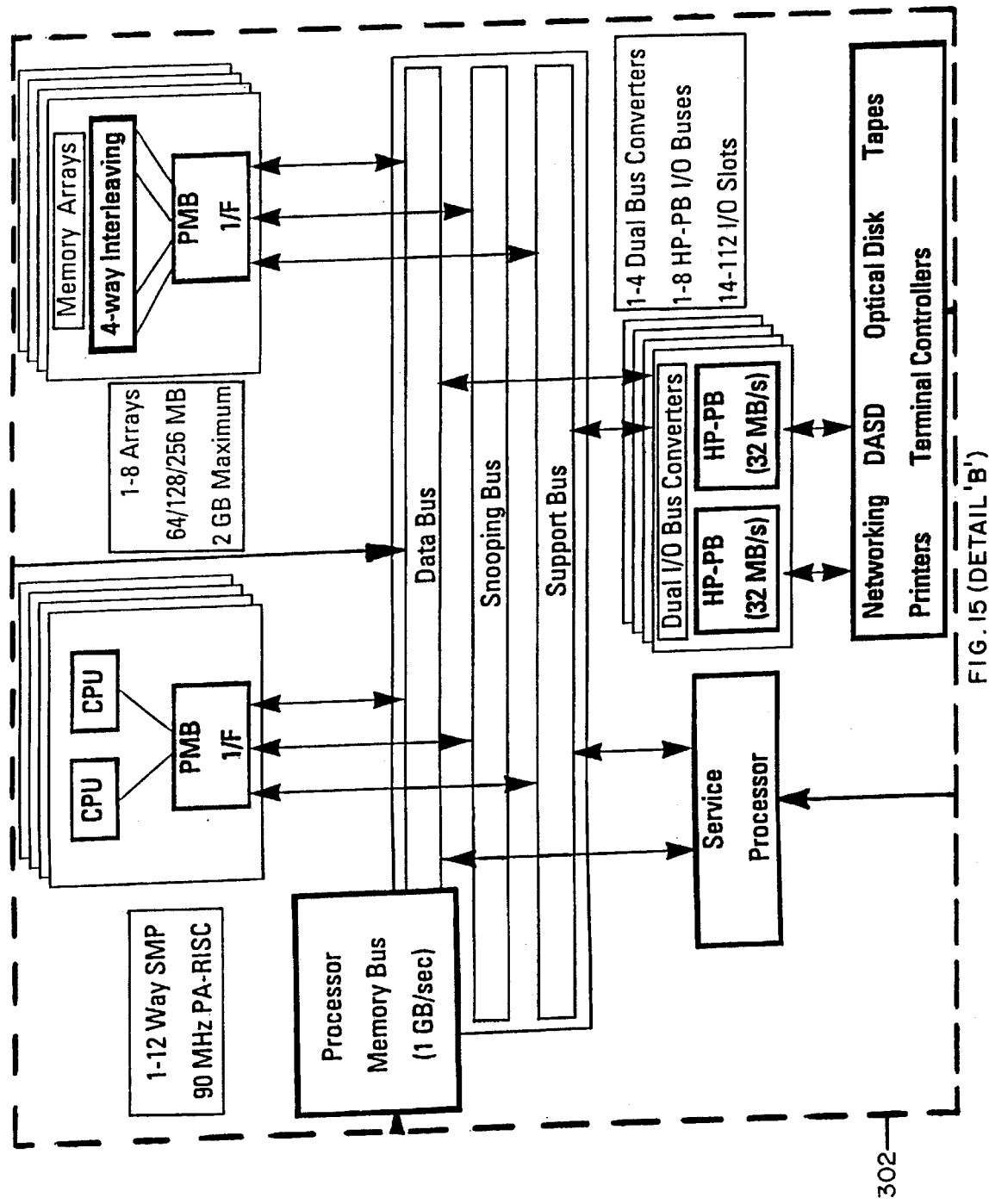
FIG. 15 (DETAIL 'B')

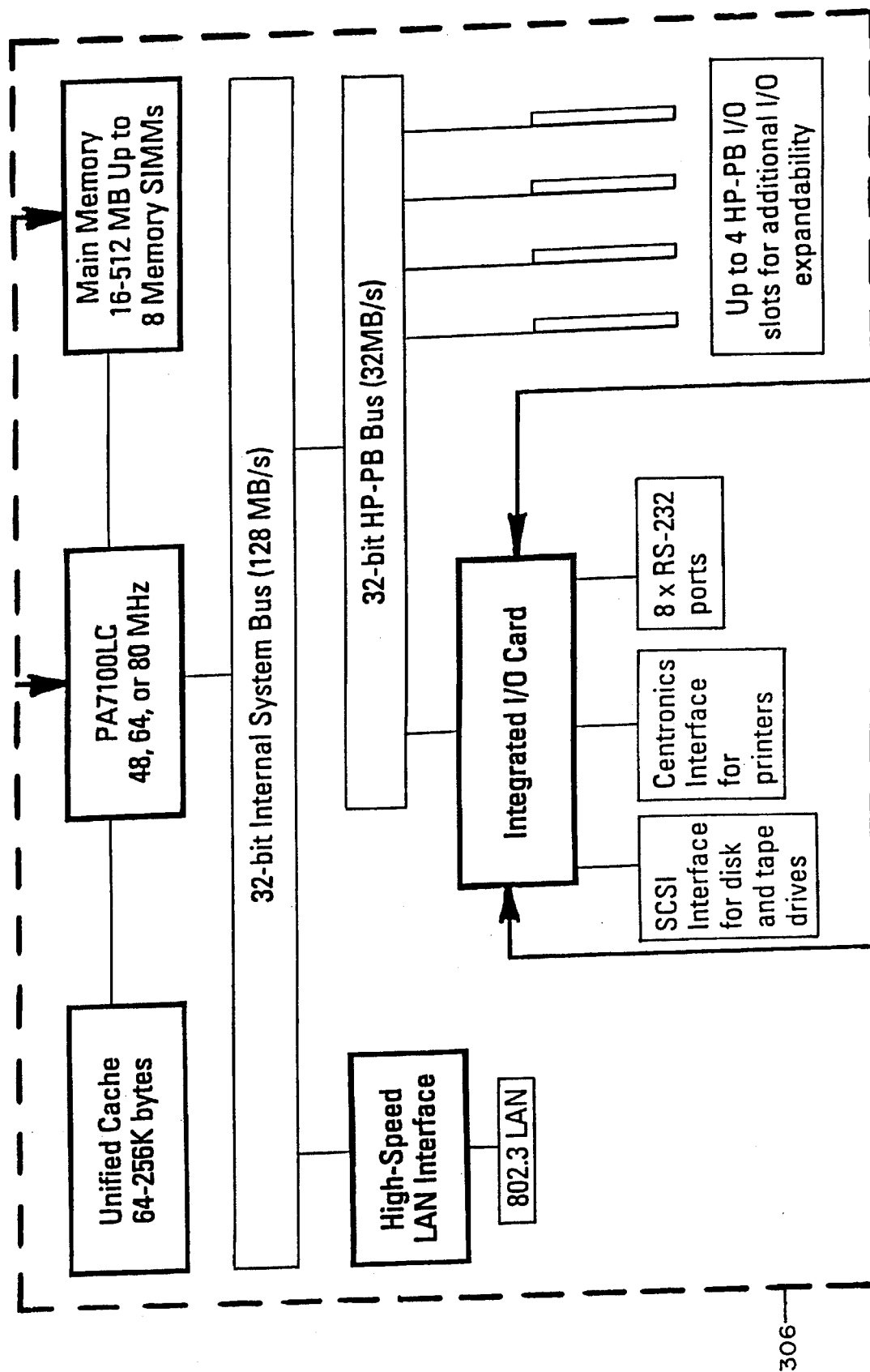
FIG. 16 (DETAIL 'C')

```
5   B$(2) = " ":B$(1) = "X"
10  Z$ = "WHAT IS THE "
15  A$(1) = "    TEMPERATURE"
20  A$(2) = "         VOLUME"
25  A$(3) = "       PRESSURE"
30  A$(4) = "   NUMBER MOLES"
35  A$(5) = "DEGREE FREEDOM"
40  A$(6) = "HEAT YOU ADD   "
45  X$ = "T,V,P,Q,N)"
50  U$ = "WHAT CHANGES "
55  W$ = "CONTINUE ADDING WORK"
60  R$ = "AS A RESULT"
65  M$ = "T=1:V=2:P=3:N=4:"
70  L$ = "DF=5:Q=6:A=7"
75  W$ = "IS T,V, OR P CONSTANT:"
80  V$ = "(T=1:V=2:P=3)"
85  N$ = "VOLUME TO LARGE, REDUCE"
90  S$ = "                    "
95  HOME
100 B = 1:C = 2
105 E = 2.71826
110 R = .082
115 X(1) = 273:X(2) = 22.4
120 X(3) = 1:X(4) = 1
125 X(5) = 3
126 VTAB (2)
127 FOR N = 1 TO 6: PRINT Z$ + A$(N) +
    "?"; TAB( 19);X(N): NEXT N
130 B(2) = 1
135 B(1) = INT (X(2) * .5 + .5)
140 VTAB 9: PRINT S$;S$
145 FOR X = 2 TO 1 STEP -1
150 FOR N = 1 TO 6
155 PRINT "I";
160 HTAB B(X): PRINT B$(X)
165 NEXT N
170 VTAB 10: NEXT X
175 VTAB 16: PRINT S$;S$
180 VTAB 18:B(2) = B(1)
200 FOR N = 1 TO 6
205 V = X(N) * 100 + .5
210 X(N) = INT (V) / 100
215 PRINT A$(N); TAB( 19);X(N);
220 PRINT TAB( 26);Y(N);
225 PRINT TAB( 33);Z(N)
230 Z(N) = Y(N):Y(N) = X(N)
235 NEXT N: PRINT :X(6) = 0
240 PRINT "CONTINUE Y OR N";
245 INPUT A$
250 IF A$ = "N" THEN 600
255 PRINT M$;L$
260 PRINT U$;" ";B: VTAB 23
265 PRINT U$;: INPUT B
270 IF B = 7 THEN 500
275 IF B = 5 THEN 320
```

FIG. 17

```
280  IF B = 6 THEN 390
285  PRINT U$;R$;" "C;
290  INPUT C: IF B = C THEN 310
300  IF C > 3 THEN 310
305  GOTO 320
310  PRINT "CHANGE WRONG, TRY ";
315  PRINT "AGAIN": GOTO 290
320  PRINT Z$;"NEW ";A$(B);
325  INPUT X(B)
330  IF C > 1 THEN 345
335  X(1) = X(2) * X(3) / R / X(4)
340  GOTO 455
345  IF C > 2 THEN 375
350  X(2) = R * X(1) * X(4) / X(3)
355  GOTO 455
360  IF C > 3 THEN 375
365  X(3) = R * X(1) * X(4) / X(2)
370  GOTO 455
375  IF C > 5 THEN 390
380  X(4) = X(3) * X(2) / X(1) / R
385  GOTO 455
390  PRINT A$(6);: INPUT X(6)
395  PRINT W$;V$;: INPUT F
400  IF F > 1 THEN 425
405  E9 = X(6) / X(4) / X(1)
410  X(2) = X(2) * E ^ E9
415  X(3) = Y(3) * Y(2) / X(2)
420  GOTO 455
425  V = X(5) + (F - 2) * 2 / X(4)
430  X(1) = X(1) + X(6) / V
435  IF F = 3 THEN 450
440  X(3) = R * X(1) * X(4) / X(2)
445  GOTO 455
450  X(2) = R * X(1) * X(4) / X(3)
455  IF X(2) < 75 THEN 465
460  PRINT : PRINT N$: GOTO 255
465  HOME : GOTO 135
500  PRINT U$;" P=1 OR V=2 ";
505  INPUT C
510  G = (X(5) + 2) / X(5)
515  IF C = 2 THEN 545
520  PRINT "NEW PRESSURE ";
525  INPUT P2
530  V2 = X(3) * X(2) ^ G / P2
535  V2 = V2 ^ (1 / G)
540  GOTO 560
545  PRINT "NEW VOLUME ";
550  INPUT V2
555  P2 = X(3) * X(2) ^ G / V2 ^ G
560  T5 = P2 * V2 * X(1)
565  X(1) = T5 / X(2) / X(3)
570  X(2) = V2:X(3) = P2
575  HOME : GOTO 135
600  PRINT "GOODBYE"
```

FIG. 18

```
        Screen
        Display

WHAT IS THE    TEMPERATURE?273 DEGREES KELVIN
WHAT IS THE          VOLUME?22.4 LITERS
WHAT IS THE         PRESSURE?1 ATMOSPHERES
WHAT IS THE    NUMBER MOLES?1
WHAT IS THE DEGREE FREEDOM?3
WHAT IS THE HEAT YOU ADD  ?0 CALORIES

------------------------------------
I      X
I      X
I      X
I      X
I      X
I      X
------------------------------------

TEMPERATURE    273   0   0
          VOLUME    22.4  0   0
        PRESSURE    1     0   0
     NUMBER MOLES   1     0   0
   DEGREE FREEDOM   3     0   0
     HEAT YOU ADD   0     0   0

AUTOMATIC TIRE PRESSURE CONTROL SYSTEM FOR A VEHICLE

This is a continuation-in-part of application Ser. No. 07/831,187 filed on Feb. 5, 1992 now abandoned.

BACKGROUND OF THE INVENTION

1) Field of the Invention

The present invention relates to vehicles having pneumatic tires.

Tire inflation pressure and tire temperature are important safety parameters for automobiles, trucks and other vehicles. Proper tire inflation pressure and temperature regulation are necessary to insure safe traction on slippery road conditions and to prevent excess wear on tires.

A modern pneumatic tire is typically a tubeless tire mounted to a wheel rim and has a valve stem extending from the wheel rim. Inflation of the tire is achieved by connecting a suitable air pump to the valve stem and supplying air and a sufficient pressure to open the valve and inflate the tire. Traditionally air pumps are found at gasoline service station and the like. With the trend toward self-service stations, motorists who wish to inflate their tires must do it themselves.

It is to be appreciated that on a cold rainy night that it is neither convenient nor comfortable to have to inflate one's tires. Accordingly, it would be desirable if tire inflation could be automated in a manner that is both safe and reliable.

The main purpose of the invention is to provide a reliable, economical and energy efficient means of providing air to the tires of vehicles and to improve the safety, handling and operation of the vehicle by means of regulating tire air pressure. The thrust of the invention encompasses the application of such a system to all vehicles and thus embraces its use for public, commercial, industrial and government installations. It is desirable to allow the system to be retro-fitted into existing vehicles, thus allowing existing components to be utilized and energy saving processing of these components minimized. The benefits attributed to this system are energy conservation due to reduced automobile usage for locating an air pump source, improved gas mileage due to proper tire inflation which is continuously monitored, reduced tire wear and improved safety of operation and handling, convenience of tire air pressure regulation in all-weather conditions, reduced probability of tire related accidents and reduced use of other vehicles responding to such accidents resulting in reduced energy consumption.

1A) ENERGY CONSERVATION POTENTIAL

Transportation Type a) Individual (Automobile, Motor Cycles, Recreational Vehicles)

The need to provide and maintain proper tire inflation pressure in automobile tires is well documented. When one has lost the required tire pressure, the most common method of replenishing this air is to drive to a service station and use an air pump. As many people may have noticed, the availabilty of air at service stations is not as common as one would like. In some service stations air is not available at all. In others there is a coin operated air pump costing about fifty cents. An obvious consumption of energy is driving to a service station and finding there is no air pump service and then having to drive to another and pay for air. On sundays some stations are closed and so is their air pump. That means driving and using gasoline to find a service station that is open. Another energy consuming scenario is leaving ones home and finding that the only thing missing before the trip is air pressure in the tires. A drive to a service station is then in order but could have been avoided with an Automatic Tire Pressure Control System.

The probability of tire failure during the operation of an automobile is greatly increased with improperly inflated tires. In the event that a tire does fail and the driver is either unable or unwilling to repair it him or herself, the scenario here is to call another vehicle in to the scene either to repair the tire at the site or tow the vehicle to a service station. This obviously means energy consumption from the service vehicle. To reduce the likelyhood of tire failure due to improper inflation pressure means less chance of requiring service vehicles that consume gasoline.

In the event that an automobile accident can be linked to improper tire inflation and consequently tire failure, it is quite evident that the number of vehicles including ambulances, tow trucks and police cars will have consumed energy under these circumstances. The potential energy savings attributed to an automatic tire pressure control system is self evident in this case.

1B) EXISTING METHODS—INDUSTRY (LOGGING TRUCKS)

a) Overview

In recent weeks I have been in contact with the United States National Forest Service. I spoke with Leonard Della Moretta, who was responsible for correcting the road damage created by logging vehicles. This was achieved by reducing tire pressure when the trucks are on soft earth. This actually heals the earthen road and improves traction. When the logging trucks are loaded and must move to paved roads the tire pressure must be increased. The CTIS (Central Tire Inflation System) provided on these vehicles was developed by Eaton Corporation, U.S. Pat. No. 4,640,331 Braun et al. Eaton Corporation Assignee. This system provides air to the tires through an air channel in the axles of the trucks. It also uses mechanical rotary seals as the means for sealing the air flow. It has been pointed out to me that there are several problems with the Eaton System as is being used by the National Forest Service. These are outlined as follows:

b) Air Leakage

The mechanical rotary seals have not been able to contain the air pressure in the system. The seals are leaking continuously and has placed a greater demand on the system to provide air back to the tires during logging truck operation. This produces increased stress on the system and accelerates wear on air compressing components. This would seem to increase engine load and fuel consumption. An other source of air leakage is through the air line in the axle. This is due to saturation of the walls of the metal shaft due to imperfections in the casting of the shaft. The air finds small passages in air pockets in the shaft material and leakage then occurs. It is also understood, that creating bore holes in an existing or a new axle for air passage can significantly weaken and reduce the structural integrity of the axle during normal or strenuous operation. This may produce hair-line cracks in the axle where air leakage or failure may occur.

c) Seal Wear

The mechanical rotary seals have shown excessive amounts of wear, contributing to excessive air leakage. It is apparent that these seals have a high maintenance factor and that ferrofluid seals would lower this factor dramatically.

Ferrofluid seals inherently have extremely low friction and drag torques, therefore making them nonwearing and very reliable.

d) Inflation Time

The amount of time to inflate a logging truck tire from 25 p.s.i. (earthen road operating pressure) to 60 p.s.i. (paved road operating pressure) is approximately 30 to 45 minutes. This is a considerably long time. This long inflation time is due impart to compressor performance but is mainly due to the air line cross-sectional dimension which restricts air flow. The air flow capacity of the air lines, prior to and after the multiple air channel support shaft and fitting, is easily increased by simply increasing the cross-sectional diameter of these air lines. The difficulty arises in maintaining this air flow capacity between the air line inlet and outlet. This is what the multiple air channel support shaft and fitting achieves. By increasing the number of paths between inlet and outlet, the rate of air flow is increased and maintained constant between inlet and outlet air lines. It is also possible to further reduce inflation time by installing a turbo-charger in an engine. The turbo-charger uses the air compressed and exhausted by an engine to drive its turbo blades to produce clean compressed air that can then be fed to the tires via the air distributor. A turbine may also be incorporated into an engine of the vehicle to produce high volume compressed air for tire inflation. The use of these devices does not preclude the need for the multiple air channels, which are mandatory in these high air volume distribution systems.

1C) THE NEW METHOD—INDUSTRY (LOGGING TRUCKS)

The air channels provided in my system greatly increase air flow thus greatly reducing inflation time to about ¼ or approximately 7.5 to 10 minutes with a conventional compressor and a further increase of approximately 50% with a turbo-charged or turbine driven air feed or approximately 3.75 to 5 minutes inflation time for approximately 35 p.s.i. increased pressure from 25 p.s.i. to 60 p.s.i. This is for logging truck tires.

With multiple air passage channels, as is the case with my invention, the net air flow area is approximately 4 times greater than the flow area of a conventional cross-section air line, resulting in increased air flow capacity and reduced inflation time. The frictional resistance in the multiple air channels may be further reduced by polishing the walls of the channels to a very smooth finish and/or providing a low friction surface coating such as glass or teflon to the non-bearing portions of the channels. Actual dimensions of air channels vary depending on axle diameter, air flow requirements and bearing configurations.

The mating of the bearing support shaft and the support shaft fitting allows the bearing force from the weight of the vehicle to be distributed radially to the axle. The bearing transfer points are located between the air channels created by the interfacing of these two components. Shaft stops are provided on both ends of the bearing support shaft and fitting which locks them in place. The shaft stops are contoured to allow air to flow to the channels. Since the axle is virtually untouched and no penetration is introduced into it, the integrity of the axle is preserved. The possibilty of axle failure due to holes drilled into it and system failure due to saturation of air through such holes is eliminated with my invention. Furthermore, the introduction of air is placed at the closest point to the tire, thus reducing air line length and air friction. The air friction introduced by the multiple air channels in the bearing support shaft is negligible compared to the air friction introduced by excessively long air feed lines running through axles in the old method.

1D) EXISTING METHODS—AIR AND SPACE TRANSPORTATION a) Airplanes

At the present time, to my knowledge, there are no automatic tire pressure and temperature control systems in use on commercial or military aircraft. It would be most benefical in this application, for the Pilot and First Officer to have an automatic tire pressure and temperature control system indicator in the cockpit of the plane. The status of the tires is important if not crucial for the safety of passengers and crew.

It has been documented that a large jet airplane experienced tire failure shortly after take-off. The crew was not aware of the problem at this time but when they landed they realized there were no operable tires.

The disaster that followed claimed many lives. Since the crash of this ill-fated airplane, the wheels have been redesigned to correct a fatal flaw. The reason that the tires failed was that when the plane accelerated for take-off the tires heated up beyond a critical limit. The tires could not withstand the increased pressure and consequently exploded. A new wheel design provides a hole in the wheel that contains a meltable metal fuse. So if the tire becomes too hot, the fuse melts and the air escapes through the wheel thus saving the tire from damage. The air then has to be manually replenished in the tire before landing unless there are sufficient tires left to allow for a safe landing. There is a switch that alerts the pilot to this condition when it occurs. It would be a great improvement to be able to automatically reduce tire pressure when this high temperature condition occurs and then automatically increase it when the condition subsides. This would provide a major increase in the safety factor and avert a disaster above and beyond the system now in use. This is because the tire would not have to lose all of its air, only the portion necessary to safely operate the tire. The tire would be re-inflated more quickly in the automatic mode described and reduce the probability of accidents.

Ferrofluid seals operate much cooler than mechanicals seals, can withstand high pressure and high speed and are very resistant to impact. These make them ideal in an aeronautical environment. They have an operating range of −72 Deg. F. to +185 Deg. F. Mechanical seals would find it difficult if not impossible to operate under these conditions and maintain a zero air leakage factor. This broad range of operating temperatures allow these seals to be used in extremely cold and hot environments. Another important difference is that ferrofluid seals do not wear due to these temperatures, where mechanical seals are heat sensitive and have a much higher coefficient of friction which increases wear and premature component failure. It has been the norm to leave safe take-off and landing to the reliability of the tires as well as the number of tires used. In the event that one tire fails, the other remaining tires can still land the airplane safely on the ground.

It is an object of this invention to reduce the likelyhood of tire failure on airplanes due to the use of highly reliable zero leakge ferrofluid seals and the continuous automatic tire air pressure and tire temperature monitoring by the system.

b) Space Shuttle

All of the conditions that apply to airplane tires also apply to the Space Shuttle tires, with the addition of the following conditions. When the Space Shuttle tires are inflated on earth, the tire pressure is set to the required operating pressure for the tire. When the Space Shuttle leaves the earth's atmosphere and enters into space, the pressure exerted on the outside of the tire, due to the atmospheric pressure on earth, is gone. Since the wheel well compartment is not pressurized in order to conserve air. The internal pressure inside the tire then tends to expand the walls of the tire because of the zero atmospheric resistance outside of the tire. The tire is then in a greater stress mode due to the expansion it is experiencing in space. If there are any flaws in the tire, this expansion could possibly cause tire failure. If the Space Shuttle tires were vented automatically by the proper amount during this expansion cycle (depending on the amount of stress in the tire material and the amount of expansion), a greater amount of safety could be afforded to the tires. The tires are then replenished with the required air pressure when it re-enters the earth's atmosphere. The continous monitoring and regulation of the Space Shuttle's tires could alert the astronauts to any emergency condition that the tires may be experiencing. The extreme temperature and pressure variations in space are well handled by the Ferrofluid Seals.

1E) CONSTRUCTION

The basic retro-fitted construction application consists of installing the ferrofluid seals in their metal housing and press-fitting the bearing support shaft and fitting onto the axle and securing it to the axle with the shaft stops. The air is fed through the magnet and across the bearing support shaft via the multiple air channels. A ferrofluid film seal also substantially reduces vibration and mechanical noise due to the extremely low friction of this component.

1F) CALCULATIONS

Supporting calculations for air flow in multiple air channels as described in section (1C) entitled—"THE NEW METHOD".

In order to support the claim that a substantially greater amount of air can be fed to logging truck tires in a much shorter amount of time, the following calculations are being provided.

Assume a logging truck axle has an air feed bore hole of about 1 centimeter in diameter. The area of this conventional bore hole is then 0.7854 sq.cm. The average number of air channels provided around the bearing support shaft is 16. If one air channel provides a maximum of ¼ of the air in the conventional air line (about 0.19635 sq.cm.), then the total amount of area provided by 16 air channels is 3.1415 sq.cm. or 4 times the 1 cm. diameter hole. The conventional supply air line area at the inlet and outlet of the air flow path, can then also be increased to four times its original area of 0.7854 sq.cm. This makes the area of the air line 3.1415 sq.cm. at both the inlet and the outlet of the air flow path, which is then equal to the total area of the 16 air channels around the bearing support shaft. We now have a balanced cross-section of air flow, where the quantity of air being moved has been increased by a factor of four and that the areas of inlet, air flow path and outlet are at least 3.1415 sq.cm. The radial cross-sectional area of the annular air chamber being in the air flow path and created by the ferrofluid seals, the fixed annular magnet and the annular pole blocks, is equal to at least the area of the inlet, the composite area of the multiple channels and the outlet and may be greater than the area of each of these areas so as not to impede the air flow or create any restricted air flow. Furthermore, there is no possibility of lubricant contamination from the bearings since the air flow path is completely isolated from lubricants, due to the carbon/graphite seals, the ferrofluid seals, the bearing support shaft and the support shaft fitting which shields the multiple air channels from lubricants. The bearing support shaft and support shaft fitting are press-fitted over an existing axle so that the multiple air channels between these two components are of an exact surface area and volume. This surface area and volume can be designed for a specific air flow characteristic for a specific vehicle. This does not leave the air flow parameters to chance.

The air at the channel surface is a retarded layer of air about 1 millimeter thick and moves slower than air in the center. The majority of the air in the channel however, is moving with uniform velocity. This majority of air is referred to as the central portion of air. The friction resulting from the interaction between the retarded layer of air and the central portion of air is measured as the coefficient of viscosity. Furthermore, although this viscosity also increases the effective mass of the air in the channel and diminishes the wave velocity, the effect is said to be quite small. The benefit of having multiple air channels as opposed to a single air channel becomes quite clear. This being the ability to move much greater amounts of air through a plurality of air channels, without incurring any substantial amount of resistence due to the increased number of channels.

1G) SEAL PERFORMANCE DATA

The operating principle of magnetic seals consists of an annular magnet being placed over the axle shaft contacting an annular pole block on either side. With this arrangement a magnetic field is produced and enforced in its effect by placing thread type serrations on the bearing support shaft and fitting surfaces or on the inside diameter of the annular pole blocks. The clearance gap between the annular pole blocks and bearing support shaft and fitting surfaces is filled by the ferrofluid and is part of the magnetic flux path. The fluid bridges the passageway, blocking any trace of leakage flow. The axle shaft is free to rotate without frictional disturbances by the ferrofluid. Without solid mechanical contact no wear is possible and the friction generated in the fluid film is negligible. Even at exterme rotational shaft speeds, maintenance is not required.

Manufacturers claim successful operations at speeds of the order of 10,000 revolutions per minute in gaseous atmosphere under pressure or vacuum without leakage. This classifies them as having a 'zero leakage' factor. They are also used to effectively contain petroleum derivatives, therefore are capable of sealing liquids as well as gases successfully. Clearance gaps are typically 0.002 to 0.005 inches. Temperatures must be maintained at a maximum of 225 Deg. F. or below to prevent sufficient carrier fluid evaporation. This is within the operating range of the ferrofluid seals.

Ferrofluid seals use a magnetic fluid to seal the clearance gap in single and multiple magnet ferrofluid seal arrangements. This magnetic fluid prevents any leakage from occurring and is thus ideally suited for applications where any leakage is intolerable such as in vehicle tires. A ferrofluid consists of a carrier liquid that contains ultramicroscopic particles of a magnetic solid such as magnetite. They are colloidally suspended, then stabilized by physiochemical means. To prevent flocculation even under the influence of a magnetic field, the particles are coated and random collisions (Brownian Motion) with the molecules of the carrier liquid keep the particles in colloidal suspension for an indefinite period of time.

At the present time, commercially available ferrofluids are electrically nonconductive in carrier liquids such as fluorocarbons, hydrocarbons, polyphenyl ether and aqueous solutions. Chemically and mechanically, the magnetic fluid offers the same characteristics as those provided by the carrier liquid in which the magnetic particles are colloidally suspended. The saturation magnetization for typical carrier fluids range from 200 to 450 gauss. These low flux densities usually do not pose a problem where magnetic fields are concerned and low energy product magnets can be utilized in the assemblies. Screened designs such as the one shown in FIG. 10 and referred to in FIG. 4RP can be incorporated where any stray flux is detrimental.

Some commercially available Ferrofluidic seals operate in a pressure range from 0 to 100+ p.s.i. They exhibit zero leakage (less than $1.0 \times 10^{-8}$ standard cc helium/sec) independent of speed. Their rotary speeds range from 0 to 1000+ r.p.m. They have low breakaway and running drag torque (<25 in-lb). Their operating environment conforms with Military Environmental Exposure Tests MIL-STD-810, Military Thermal Exposure Range -40 degrees centigrade to +85 degrees centigrade. They are submergible in wheel hub lubricating oil.

1H) DIFFICULTIES

The major difficulties encountered so far have been as follows:

a) To develop a working prototype for a logging truck application, it would be necessary to obtain an actual logging truck. This might be available either through Eaton Corporation who developed a similar system as described earlier or through the National Forest Service or through the actual logging truck manufacturer. Actual drawings must also be obtained from the manufacturer of axle (front & rear) and hub with dimensions. This is required in order to actually size the retro-fitting and get a more accurate cost analysis. The testing of the ferrofluid seals as well as the pneumatic regulating and monitoring system should be done in a rigorous manner. For this reason I have suggested that the tire inflation system be incorporated in race car applications. The stresses encountered under these conditions would prove to be invaluable in determining the durability of the system components. We are in the process of contacting NASCAR and Formula car teams such as Penske. We hope they will be interested in such a system since it may provide an advantage on the race track. They are well equipped and could very easily provide us with the expertise and the facilities for the construction of this invention. This could be a real proving ground and I forsee some very valuable data that can be generated and realistically implemented for future use on automobiles and other vehicles. Safety and reliability are two key points of interest here as well as clarifying existing notions about tire inflation pressure and tire operating temperature at increased speeds.

2) Description of the Prior Art

I would like to discuss at this time what I consider to be the main features of the invention, that distinguish it apart from Magnuson and all other inventions cited, making it new, unique and a great improvement over the prior art of Magnuson and all others.

The most distinct features of the invention are the annular ferrofluid seals (38) and the special axle sleeve (62) that are used in both front and rear axle arrangements. These features are not shown in any of the inventions cited. It is imperative in a vehicle tire inflation system that the air leakage rate of the seals incorporated is zero. This safety feature must be adhered to under all operating conditions at all times. It is this critical aspect of the Ferrofluid Seal that makes it a vast improvement over a conventional mechanical face seal which tends to leak inherently due to its design.

Section (1F) gives a physical description of the magnetic Ferrofluid Seal, stating that it prevents any air leakage from occurring and is thus ideally suited for applications where any air leakage is intolerable. The advantage of such a seal can be greatly appreciated, especially where safety and lives may be at stake.

The special axle sleeve (62) also plays an important role in the elimination of leakage. In this instance the sleeve provides a means for isolating the air flow path from contaminants such as grease and wheel bearing lubricants. Since the special axle sleeve is made of hardened steel or similar, it is impermeable to grease, lubricants and contaminants existing outside of it, making it ideally suited for this application. The leakage of grease and lubricants into the air flow path is eliminated due to the incorporation of both the Ferrofluid Seals and the special axle sleeve. The Ferrofluid Seals are further protected from any grease, lubricants or contaminants by the Carbon/Graphite seals. These Carbon/Graphite seals are introduced on both the grease and lubricant side and the air flow path side of the Ferrofluid Seals to eliminate contaminants from reaching the Ferrofluid Seals.

In U.S. Pat. No. 5,080,156 of Bartos it is disclosed that there are existing spaces where "The seal arrangement relative to the one bearing unit provides for the flow path for air between the on board system and the vehicle tire to include the spaces between the bearing elements and the inner and outer bearing races of the one bearing unit." from [57] Abstract. These spaces are not the same for all vehicles and in this case is shown for a "stationary axle housing and a rotatable hub which carries the vehicle tire and which is mounted on the axle housing for rotation" from [57] Abstract. In this case the axle is not active or turning. In the case of a powered or active axle, such as that in a GM rear wheel drive or Nissan front wheel drive car, the space configuration between two bearing elements may be quite different and may become quite restricted as is typical in the rear axles of Datsun/Nissan models with independent rear suspension.

The design of my special axle sleeve takes these differences into consideration and provides a reliable grease-free air flow path which is both structurally sound and highly isolated from these contaminating lubricants. In column 8 lines 5–36 of the preceding patent referred to, it is disclosed that a "Grease baffle" is made to "minimize the entrainment of grease in the air stream" and "further minimize the possibility of entrainment of grease in the air stream flowing through bore (44) to the vehicle tire." It also refers to "the bearing grease is relatively viscous and stable when the vehicle is not in motion, whereby centrifugal force together with the viscous nature of the grease in the radially inwardly open pockets of the grease baffle defined in inner chamber (112) by the baffle walls therein." and further "Centrifugal force and the viscous nature of the grease likewise tend to mainatin any grease entering outer chamber (114)" and further states "Furthermore, the positioning of the inner end of bore (44) close to sleeve (110) together with the radial overlapping relationship between the inner end of the bore and the radially outer edge of the baffle wall (126) causes the air flowing between bore (44) and opening (116) to follow a circuitous path which minimizes the likelihood on any grease in outer chamber (114) becoming entrained in the air stream entering bore (44) during tire inflation, or entering opening (116) during a tire deflation operation." The major differnce of my method is that is does not merely minimize the entrainment of grease but more importantly eliminates it. It also does not rely on centrifugal forces or the relative viscosity of the grease or the motion of the vehicle, which all appear to be doubtful means to restrict the infiltration of grease in this critcal application.

I would like to point out, that of the all the inventions cited in this Specification, my invention is the only one that adequately addresses both active and passive rear axle and front steering axle as is found in most automobiles.

My system is truly a complete tire inflation system because it provides a sealing mechanism for these two distinctly different front and rear wheel applications. There is no Patent cited that does this. Bartos cites "a stationary axle" meaning passive, Gandhi cites "an inflated tire mounted on a rotatable wheel" non specific, Hulme cites "a crankshaft to be connected to the vehicle axle to rotate therewith;" meaning active, Goodell cites "An axle extends through the spindle and is connected to the hub to impart rotational movement to the hub." meaning active and FIG. 1. sheet 1 showing a front wheel drive. Scholer cites "For use with a vehicle having at least a front tire and a rear tire," non specific, Vollmer cites "a steered" and "an unsteered vehicle wheel" and "a vehicle wheel carried on an axle part" no reference is made to the conditions that are found on active and passive axles for these steered or unsteered wheels. No figures are presented that discern these aspects of the invention as claimed. Bitonti cites "The drive torque to an axle shaft" means active. "Boulicault cites "in tire (2) of a wheel (3) of an automotive vehicle, which is not shown" in column 3 lines 6–7 and "either a drive or a bearing axle, or the front or rear steering axle" column 3 line 9–11, although no figures are shown or reference made to the conditions at these locations. This patent is primarily for an improved valve. "Magnuson cites "a tractor having eight wheels and a trailer having six wheels", no references are made or figures given to axle configurations. This patent is primarily for a valve. Gant cites "a rotary axle 28" meaning active, in column 3 line 53. Braun cites "An axle shaft (not shown) rotationally driven by conventional means", meaning active, in column 4 lines 47–48. Reference is made to "wheel-end assemblies" in column 5 lines 4–5 but no supporting figures are given. Braun states "It is understood, of course, that the present invention is equally applicable to wheel hub/axle housing assemblies (also called "wheel-end assemblies") of other constructions." This is most definitely not the case since the physical construction and layout of the components of a rear axle shaft are substantially different from the layout of a front wheel with a steering knuckle not to mention a front wheel drive axle, and vary from manufacturer to manufacturer. I feel that it would be a very serious mistake to assume that the design and installation of a tire inflation apparatus is the same for all wheel conditions both actively and passively driven. For this reason I am including one drawing for each of these conditions to adequately teach this difference.

So it would seem that my invention, addresses the inherent problems associated with providing a highly reliable sealing system and means for providing air to both active and passive tires of a vehicle. The methods for doing so are very well defined, since they incorporate the ferrofluid seals and the special axle sleeve in a unified system that is resolved for both active and passive axles. I feel that this distinguishes my invention in a substantial way and should be considered an improvement over the prior art.

SUMMARY OF THE INVENTION

The invention is an Automatic Tire Pressure Control System which regulates vehicle tire pressure and monitors tire temperature automatically. This is achieved by means of an engine driven air compressor which feeds air to each tire separately when the tire pressure drops below the required inflation pressure in order to maintain a constant tire air pressure. This assures proper tire performance based on manufacturer's specifications, thus increasing safety of operation and reducing wear. The monitoring system which indicates air pressure and temperature regulating activities, is located in the dashboard and consists of indicators that monitor tire pressure and temperature for each tire and controls for changing tire pressure when vehicle loads vary or when increased speed requires increased inflation pressure. The tire pressure drop may be due to air loss caused by road bumps, potholes, tire leaks or other probable causes when diagnosed. The air may be replenished in the tire when the vehicle is moving or stopped with the engine running. A reservoir is provided to feed compressed air to the tires without engaging the engine driven compressor with the engine on or off. When the reservoir is depleted of sufficient compressed air pressure to properly inflate the tires, the compressor is then engaged and engine driven to refill the depleted reservoir. The air compressor also feeds air to the spare tire which is regulated and monitored to insure that it is properly inflated if and when it is needed.

The Automatic Tire Pressure Control System is comprised of an air compressor and pneumatic air lines that deliver the compressed air to the tires of the vehicle. The system also contains sensors that measure the air pressure and air temperature in the tires and compare the sensed air pressure and temperature with one or more preset value. The delivery of compressed air to a tire or tires is deactivated when the micro-processor controlled comparing electronics sense that the air pressure is at a preset value. The air pressure sensor is also fitted with a temperature sensor to indicate air temperature in the tire as well as the surface temperature of the tire.

The tire inflation apparatus also sends compressed air from the air compressor to a compressed air reservoir which stores the compressed air and regulates it internally in the reservoir. The air compressor is electrically operated and is connected to the electrical system of the vehicle. The air compressor is also mechanically operated by a belt driven by a motor in the vehicle.

The tire pressure from the tires of the vehicle is sensed and displayed in numeric fashion on a dashboard mounted gauge which may be either analog or digital in its configuration. The delivery of compressed air is selectively routed to each tire independently via a distributor unit containing multiple valve elements which are in turn switched on or off to distribute air to each respective air line which is connected to a tire. A tire deflation or venting apparatus is also provided where the venting of air from a tire is selectively routed to each tire independantly via a distributor unit containing multiple valve elements which are in turn switched on or off to vent air from each respective air line which is connected to a tire.

The wheel rim of the tire contains an air channel or line which extends radially from the tire air chamber to an air lock coupling in the wheel. The air lock coupling then extends axially to mate and fit to an air lock coupling in the hub. This air tight seal is maintained once the wheel is secured to the hub via nuts on the hub bolts. The wheel may be designed to mate with the air line by means of limiting its placement on a hub to a single keyed position or may be designed to mate with the air line by coordinating its placement in any order with the threaded studs, as is generally the case with normal installation of a wheel to a hub. The air lock coupling on the hub contains an electronically switched two-way air valve for inflating the tire as well as deflating the tire to a selected air pressure. The switch is circuited to the dashboard controls via the carbon/graphite seals which conduct electricity and provide the circuit link between the dynamic and static components.

The pressurized seals on both front and rear axles are shown in the drawings as the ferrofluid type. These seals have been used satisfactorily with pressures of up to 300 p.s.i. They also provide zero leakage, are nonwearing and have a high reliability. Conventional mechanical seals of carbon/graphite, molybdenum disulphide or teflon/metallic mixtures are substantially less reliable as air seals, have a higher maintenance factor and are not cost effective in comparison for these reasons. The design of the pressurized seals will evolve to meet each specific axle, bearing and tire configuration but the concept should not change in principle. The bearing support shaft contains the air passage which provides the link between static and dynamic elements. The proper design of this component is critical and should be rigorously tested for reliability and performance.

The minimum and maximum tire operating pressures may be pre-programmed in the mirco-processor for automatic pressure regulation. Front and rear tire pressure symmetry is maintained where both front tires are equal in pressure and both rear tires are also equal in pressure but front and rear tire pairs may have different pressures. Vehicle speed will be a limiting factor for tire inflation to be activated. The vehicle should be at rest for tire deflation to be activated unless rigorous testing can prove otherwise. It should be pointed out that a substantial amount of tire deflation during vehicle high speed travel could adversely affect vehicle handling and control. It may be possible to allow small amounts of deflation at slower speeds, if and when it is field test proven to be safe. These and other processes may be pre-programmed into the computer controlled mirco-processor.

It is an object of the present invention to provide an Automatic Tire Pressure Control System that will monitor and regulate the tire air pressure in vehicles such as automobiles, without requiring the vehicle operator to leave the vehicle. It is an object of the present invention to provide such an Automatic Tire Pressure Control System that is operable during the everyday operation of an automobile and other vehicles using pneumatic tires.

An Automatic Tire Pressure Control System in accordance with one technique of the invention has as a compressed air source, an air compressor, a compressed air reservoir connected to the compressor to receive and store compressed air and a regulator to regulate air pressure in the reservoir. These air compressor elements are connected to a distributor having a plurality of valve elements each having an air line connecting to a tire. The distributor can thereby selectively distribute compressed air to a selected tire by actuation of selected valve elements.

A sealing assembly is provided for each air line to connect each air line to a tire. Each sealing assembly includes an inlet an annular seal, and an outlet. The inlet air line is connected to the distributor and has an inlet safety valve which is operable to permit passage of air only upon certain established conditions. The annular seal is a ferrofluid seal which has a fixed annular magnet fitted about the axle of the vehicle and has adjacent flanking annular pole blocks and a ferrofluid located between the pole blocks and the vehicle axle, thereby forming an annular air chamber between the pole blocks about the vehicle axle. A magnetic field having a flux density generally ranging from about 200 to 450 gauss saturization, holds the ferrofluid in place and runs through the annular magnet, annular pole blocks and vehicle axle. This is a normal design which has external stray flux leaking from the circuit. Another embodiment of the invention incorporates a Screened Design which has no internal leakage flux by the addition of two other annular magnets flanking each of the two annular pole blocks. The magnetic metal housing then becomes part of the magnetic circuit and the main source of magnetomotive force is the larger central annular magnet. Two other ferrofluid seals may then be introduced if required at the annular openings of the magnetic metal housing thus increasing the total number of ferrofluid seals to four. A further embodiment places a magnetic shield between the support shaft fitting and the axle, thereby allowing the magnetic flux to flow through the fitting and not the axle. This increases the efficiency of the circuit and isolates the internal leakage flux. The magnetic shield sleeve is typically made of a magnetic isolating metal such as Mu metal. These Screened Designs may be used when no external stray flux must be present in the general area, in the event that electronic circuits are present. Since they may be susceptible to stray magnetic fields. Mechanical seals are located longitudinally outwardly and inwardly of the ferrofluid seals to block the passage of lubricants and contaminants. The annular air chamber is in connection with the multiple air passage channels located in the bearing support shaft and fitting and the passage formed in the annular magnet. An inlet safety valve is located in the inlet air line near the passage in the magnet. An outlet air line leads from from the common air channel in the bearing support shaft to the air lock coupling at the hub/wheel interface, to a tire wheel. The air is channeled to the tire via an outlet air line in the wheel. An electronically switched two-way air valve is located in the outlet air line at the air-lock coupling in the hub. An outlet saftey valve is disposed at the interface of the tire chamber in the wheel and the outlet air line leading into the tire chamber.

The wheel has an outer surface which is normally contained by a tire to form an airtight tire chamber. The oulet air line connects with the tire chamber, and a safety valve is provided in the outlet air line at the wheel/tire chamber interface for preventing air loss from the airtight tire chamber.

Means for sensing the air pressure in the tire are provided as are means for sensing air temperature in the tire and a tire surface temperature and means for calculating a tire pressure at a given temperature. Means for displaying the sensed and adjusted pressure in a numeric display are preferably available to the vehicle operator, as are means for selecting a preset tire pressure value in a numeric display. The system uses a means for comparing the sensed and adjusted air pressure with a preset tire pressure value which activates a distributor valve element to deliver air to a selected tire when the comparing means determines that the sensed and and adjusted air pressure is below a preset value. Means are also provided for deactivating the delivering means to close a distributor valve element to stop the delivery of air to the selected tire when the comparing means determines that the sensed and adjusted air pressure is at a preset value. In one embodiment, the system further comprises remotely controlled means for venting air from a tire when the tire pressure exceeds a preselected value.

Other objects, aspects and features of the present invention in addition to those mentioned above will be pointed out

BRIEF DESCRIPTION OF THE DRAWINGS

FIG. 4 is a longitudinal cross-sectional view of an axle showing an aspect of an embodiment of an on board tire inflation system in accordance with the invention.

FIG. 5 is a transverse cross-sectional view of an axle along the line 'A'—'A' of FIG. 4.

FIG. 6 is an enlarged view of detail 'A' of the axle and is indicated in FIG. 5.

FIG. 12A is a pressure and electrical chart for the pneumatic calibrator/controller of FIG. 12.

FIG. 13A is an input/output range chart for the precision thermometer/temperature calibrator of FIG. 13.

FIG. 15 is a detail view of the portion of FIG. 14 indicated as DETAIL B.

FIG. 16 is a detail view of the portion of FIG. 14 indicated as DETAIL C.

FIGS. 17 and 18 shows a computer program for the calculation of tire air pressure, tire chamber volume, tire air and surface temperatures.

FIG. 19 is a typical computer screen display.

DESCRIPTION OF THE PREFERRED EMBODIMENT

Figure 1:
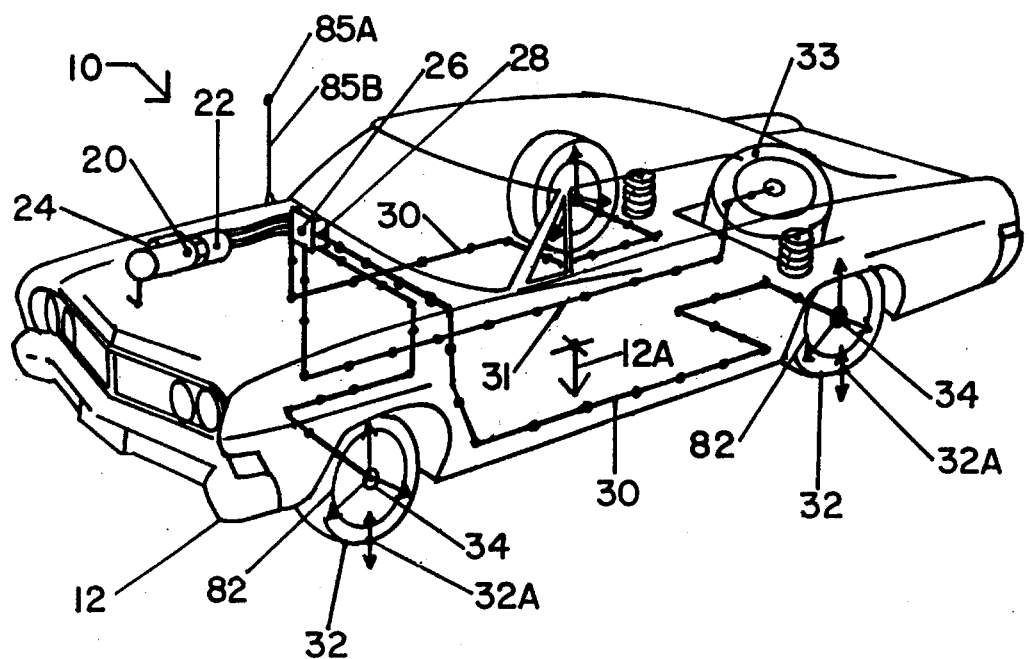
FIG. 1 is a schematic perspective view of an embodiment of an on board tire inflation system in accordance with the invention.
Figure 2:
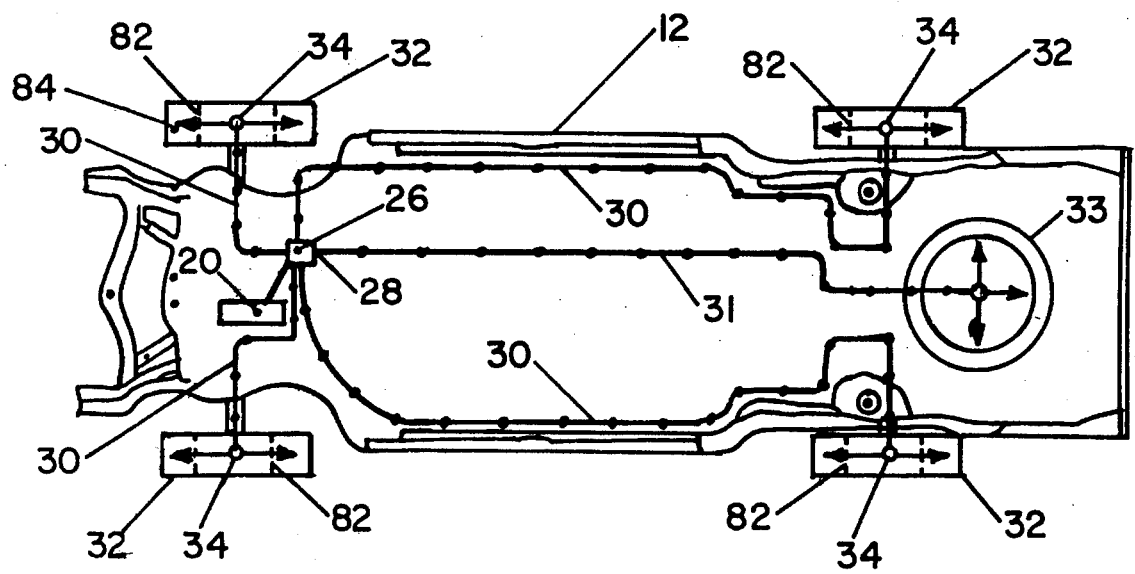
FIG. 2 is a schematic top plan view of the on board tire inflation system of FIG. 1.

Referring now to FIGS. 1–7, an automatic tire pressure control system 10 is located in vehicle 12 and comprises an air compressor 20, a compressed air reservoir 22 connected to the compressor to receive and store compressed air; and a regulator 24 to regulate air pressure in the reservoir. Preferably the compressor 20 has an inlet air filter 22A. These air compressor elements are connected to a distributor 26 having a plurality of valves 28 each having an air line 30 connected to a tire 32. An air line 31 may also be provided to inflate a spare tire 33. Distributor 26 can selectively distribute compressed air to a selected tire 32 and spare tire 33.

A sealing assembly 34 is provided for each air line 30 to connect each air line 30 to a tire 32. The sealing assembly 34 includes an inlet 36, an annular ferrofluid seal 38, and an outlet 40. The inlet air line 36 is connected to the distributor 26 and has a safety valve 42 which is operable to permit passage of air only upon certain established conditions. The annular ferrofluid seal 38 has a fixed annular magnet 44 fitted about the axle 46F or 46R of the vehicle and has adjacent flanking annular pole blocks 48 and annular pole tips 68A and a ferrofluid 50 located between the pole blocks 48 and the vehicle axle 46F or 46R in an annular clearance gap 50A, thereby forming an annular air chamber 52 between the pole blocks 48 and the flanking annular pole tips 68A about the vehicle axle 46f or 46R. The ferrofluid 50 comprises a colloidally suspended mixture of a magnetic solid such as magnetite in a carrier liquid such as fluorocarbon, hydrocarbon, polyphenyl ether or aqueous solution having the desired temperature characteristics. The outlet air line 40 has a safety valve 42 at the interface of tire chamber 84 and outlet air line 40 in FIGS. 3, 7 & 8. The ferrofluid seal 38 has a magnetic flux path 60 which is complete through the clearance gap 50A between the pole blocks 48 and the vehicle axles 46F, 46R & 66 and axle 46 of FIGS. 8, 9, 10 & 11. The ferrofluid 50 bridges the clearance gap 50A, blocking any trace of leakage flow. The axle 46 and/or the wheel 82 is free to rotate without frictional disturbances from the ferrofluid 50.

Figure 3:
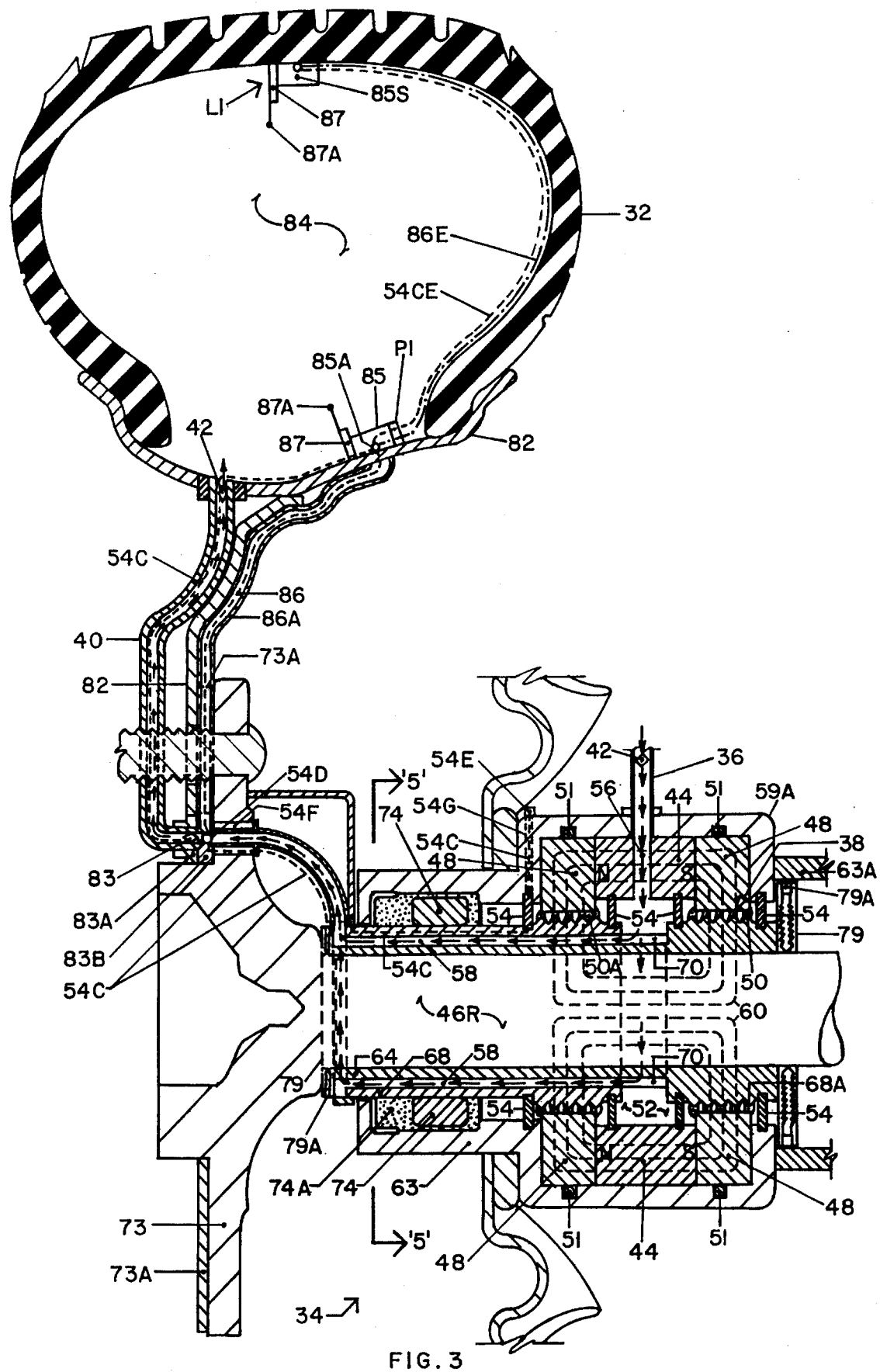
FIG. 3 is a longitudinal cross-sectional view of an active rear axle in one embodiment of an on board tire inflation system in accordance with the invention.

Mechanical seals 54 are preferably annular carbon/graphite seals and are located longitudinally outwardly and inwardly of the ferrofluid seal 38 to block passage of dirt, moisture, lubricants 74A and contaminants. Seal fittings 55 are provided. In FIG. 3 a metal housing 59A is disposed about the sealing assembly 34. This protects sealing assembly 34 from potential damage that may occur if a foreign object comes in contact with it.

Figure 7:
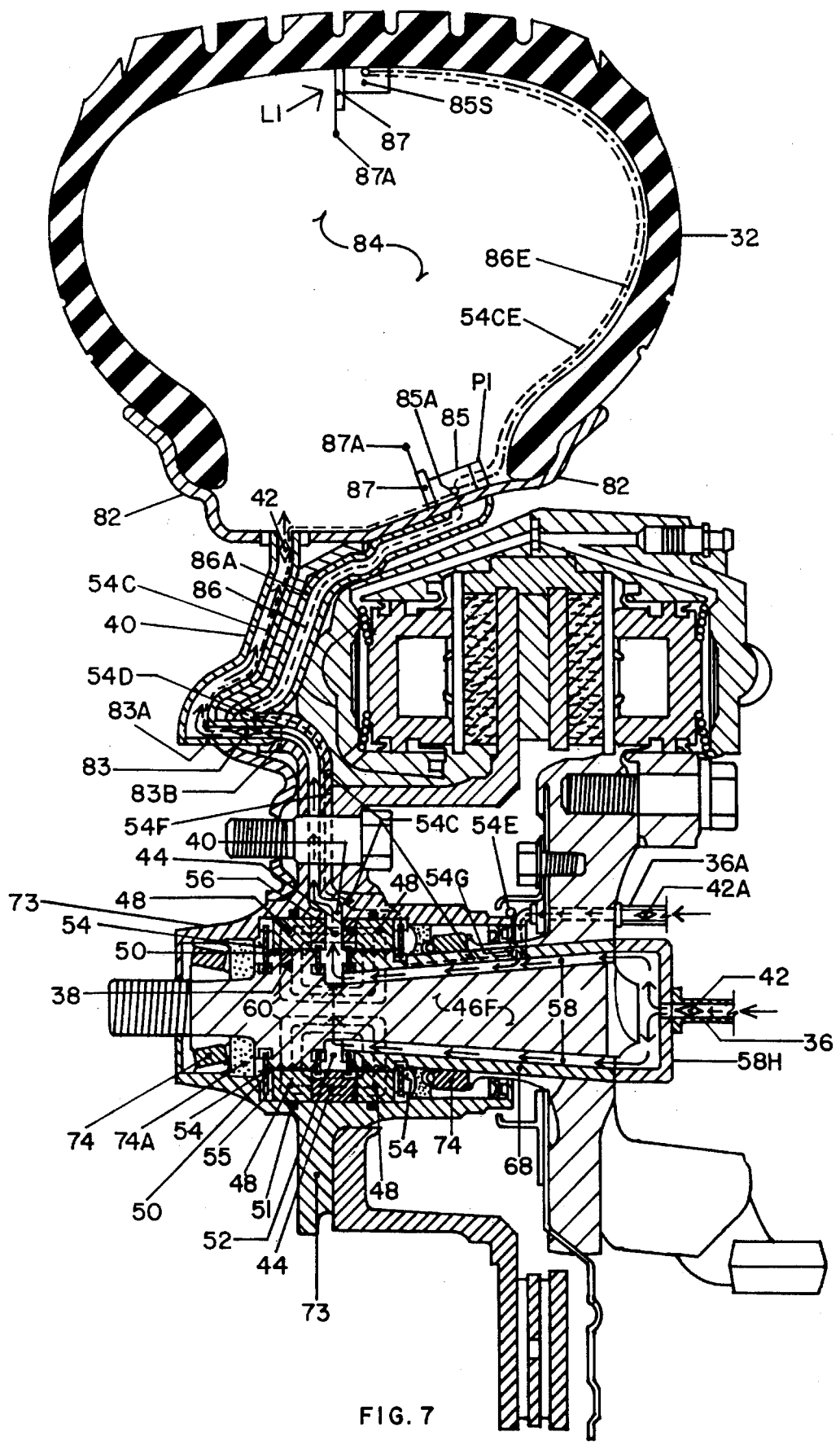
FIG. 7 is a longitudinal cross-sectional view of a passive front axle in one embodiment of an on board tire inflation system in accordance with the invention.
Figure 8:
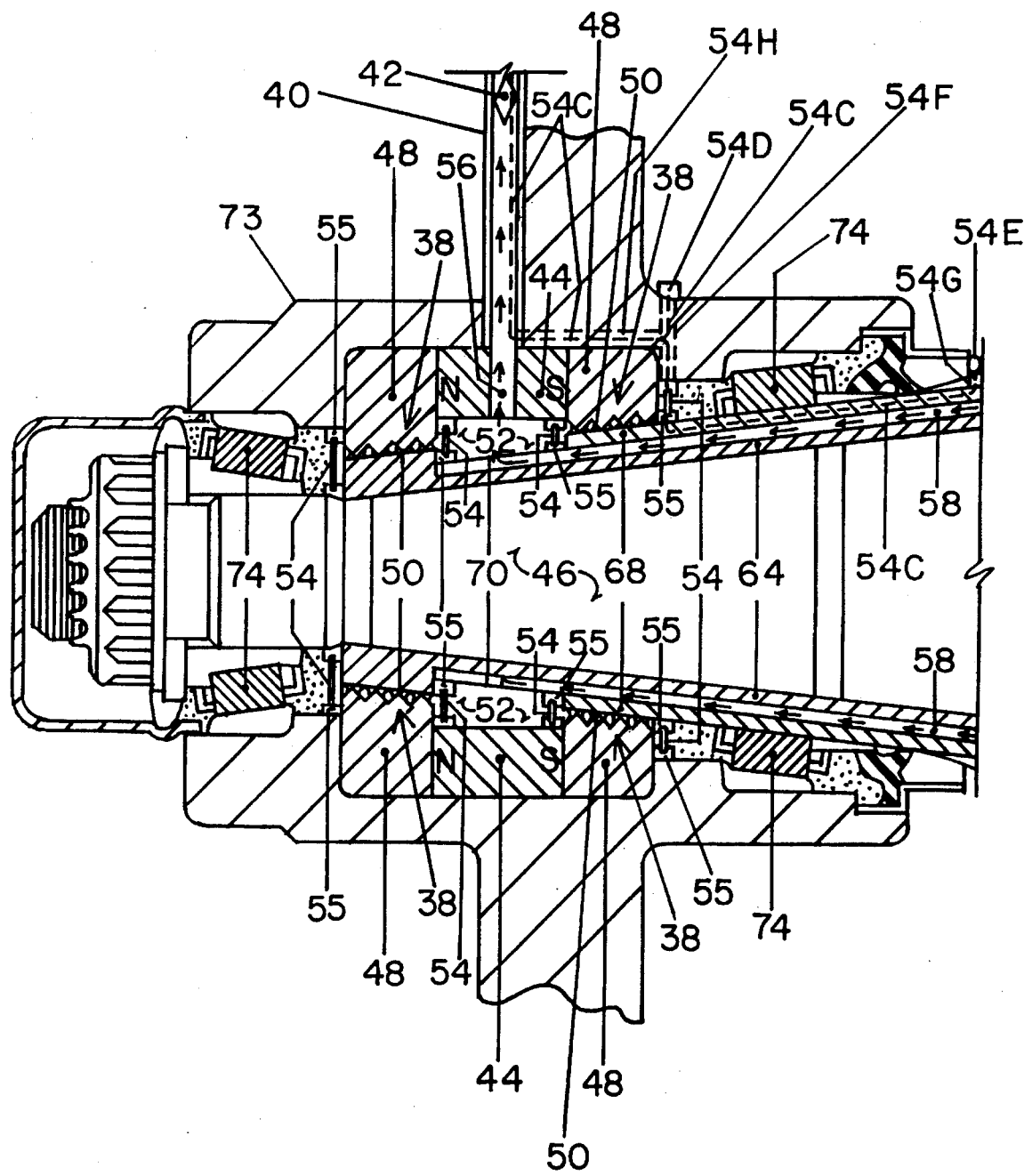
FIG. 8 is a longitudinal cross-sectional view of a passive rear axle in one embodiment of an on board tire inflation system in accordance with the invention.
Figure 9:
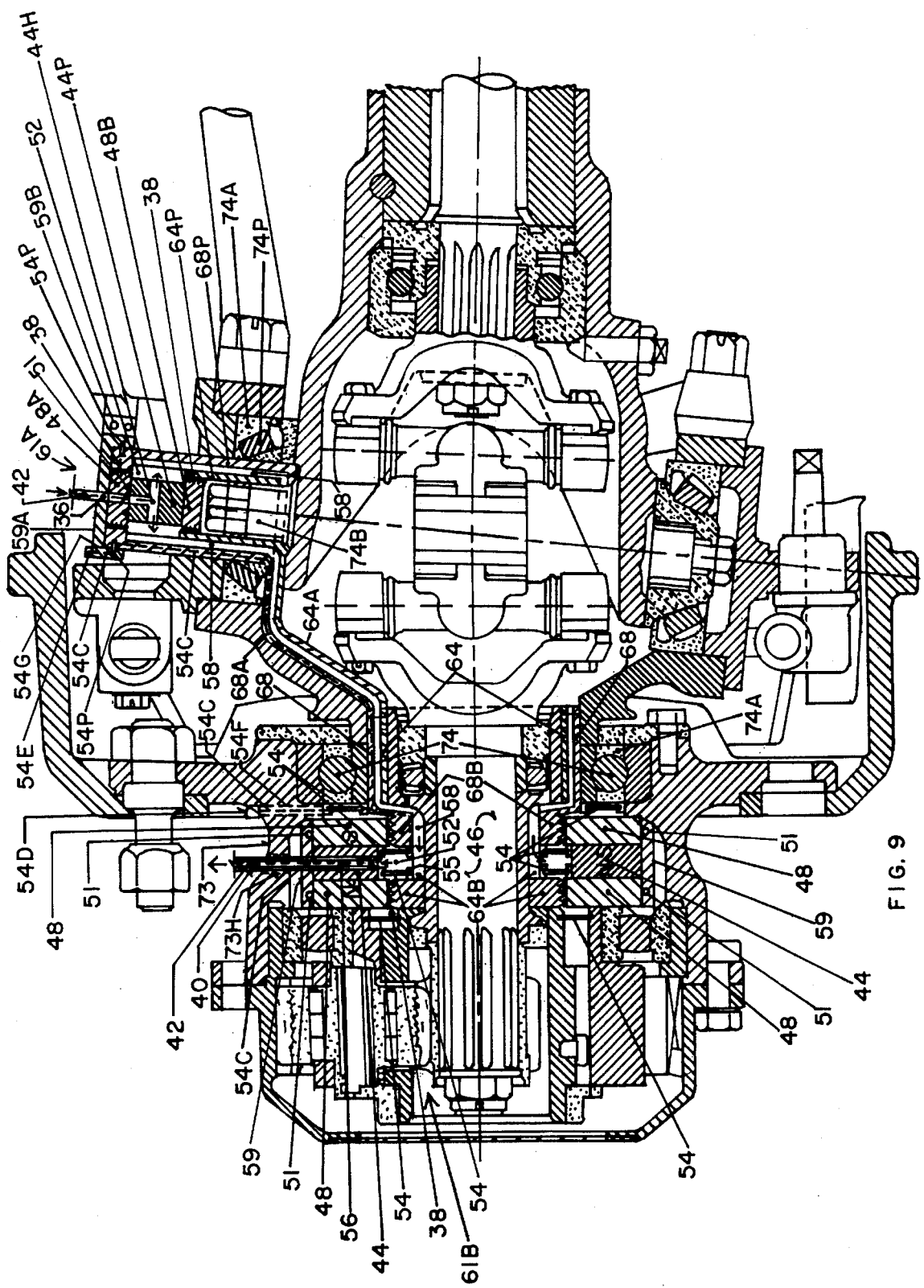
FIG. 9 is a longitudinal cross-sectional view of an active front axle in one embodiment of an on board tire inflation system in accordance with the invention.

The annular air chamber 52 is in connection with the safety valve 42 either through channels 58 extending along the axle 46F or 46R or through a passage 56 formed in the magnet 44 as shown in FIGS. 3, 7, 8, 9, 10, & 11 or through a passage 44H formed in the magnet 44P in pivoting assembly 61A as shown in FIG. 9.

As can be seen in FIGS. 4–6, channels such as channels 58 may be provided by use of a special axle sleeve 62. Axle sleeve 62 comprises a support shaft fitting 64 that fits onto axle 66 and a bearing support shaft 68 that fits over fitting 64. The outer radial surface 64M of the support shaft fitting 64 has a plurality of axial ribs 70 that fit with substantial clearance in wider channels 72 in the inner radial surface 68M of bearing support shaft 68. Mirror surface profiles are provided on the inner radial surface 68M of the bearing support shaft 68 and the outer radial surface 64M of the fitting 64 so that the two elements 68 and 64 engage and support each other with channels 58 therebetween. This leaves a plurality of axial channels 58 extending along the axle 66 for the passage of compressed air. Bearings 74 are then located about the bearing support shaft 68 of axle sleeve 62.

Figure 10:
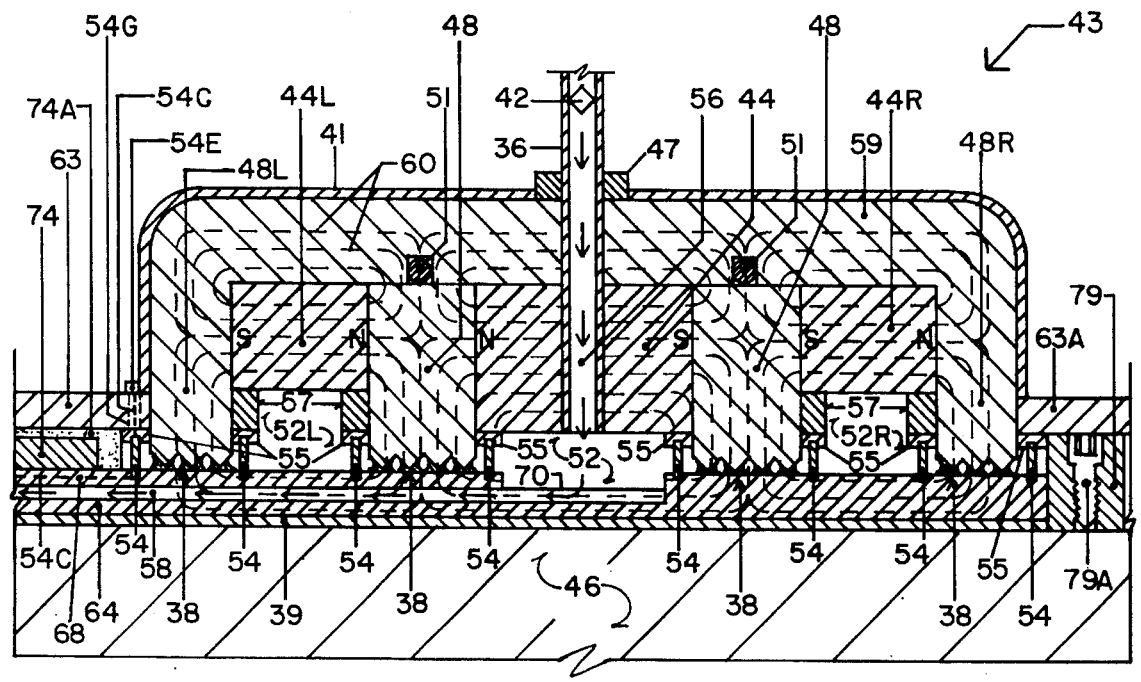
FIG. 10 is a longitudinal cross-sectional view of a modified assembly that eliminates external stray flux leakage, internal leakage flux, improves efficiency and is another embodiment of an on board tire inflation system in accordance with the invention.

Axle sleeve 62 is held in place by shaft stops 76 and 78 that may lock onto the axle by a fastening means such as set screws 79A shown in FIGS. 3, 4 & 10 and which form air cavities 80 and 81 that are in connection with air channels 58. Shaft stops 76 and 78 may be provided without air cavities if they are installed outside of the compressed air flow path as is shown by shaft stops 79 in FIG. 3 and shaft stop 79 in FIG. 10.

In FIG. 6, the bearing force transfer points 64F and 68F are designed to efficiently and evenly distribute the vehicle load 12A and the dynamic reactive load at the road/tire interface 32A as is shown in FIG. 1, about the axle 66 of FIG. 6. The bearing force transfer points 64F and 68F are located at the interface of axial ribs 70 and channels 72 of the bearing support shaft 68 and the support shaft fitting 64 and are disposed concentrically about axle 66 in equal angular increments 66I about the neutral axis 66A of axle 66. The inner radial surface 68M of the bearing support shaft 68 and the outer radial surface 64M of the support shaft fitting 64 are smooth and curved in their design between the bearing transfer points 64F and 68F in order to eliminate any possibility of fracture as might occur if the inner radial surface 68M and the outer radial surface 64M contained straight lines with sharp corners between them. The geometry of the inner radial surface 68M and the outer radial surface 64M relative to the surface of the bearing support shaft 68 at bearing point 74F is inclined and not concentric to the surface of the bearing support shaft 68 at bearing point 74F (which is a transitory point due to the movement of bearing 74) so as to minimize any bending stresses that may occur at the unsupported surface 68U of the inner radial surface 68M and at the unsupported surface 64U of the outer radial surface 64M between the bearing transfer points 64F and 68F. This further reduces the possibility of fractures occurring either in the bearing support shaft 68 or in the support shaft fitting 64.

Figure 11:
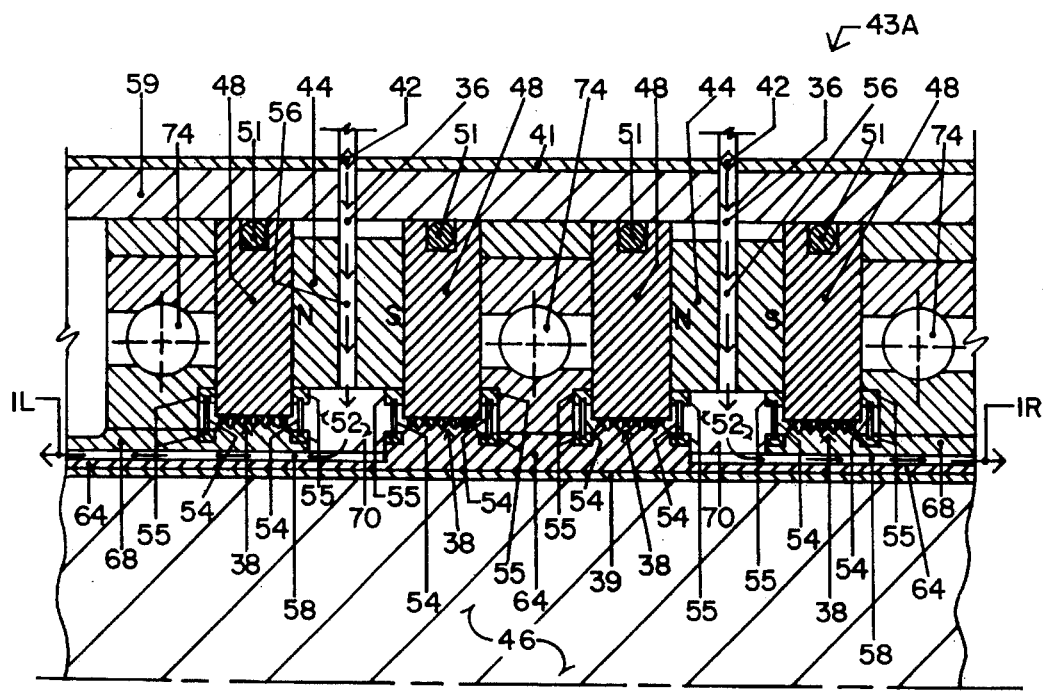
FIG. 11 is an embodiment of the invention in a two-stage double seal configuration in accordance with the invention.

Referring now to FIGS. 1–11, an outlet air line 40 leads from the annular air chamber 52 to a tire 32 and 33. The outlet air line 40 extends through channels 58 extending along the axle 46F or 46R as described above and through a passage 56 formed in the magnet 44 and in metal housing 59A, hub 73 and metal housing 59 as can be seen in FIGS. 3, 7 & 11 respectively.

Figure 12:
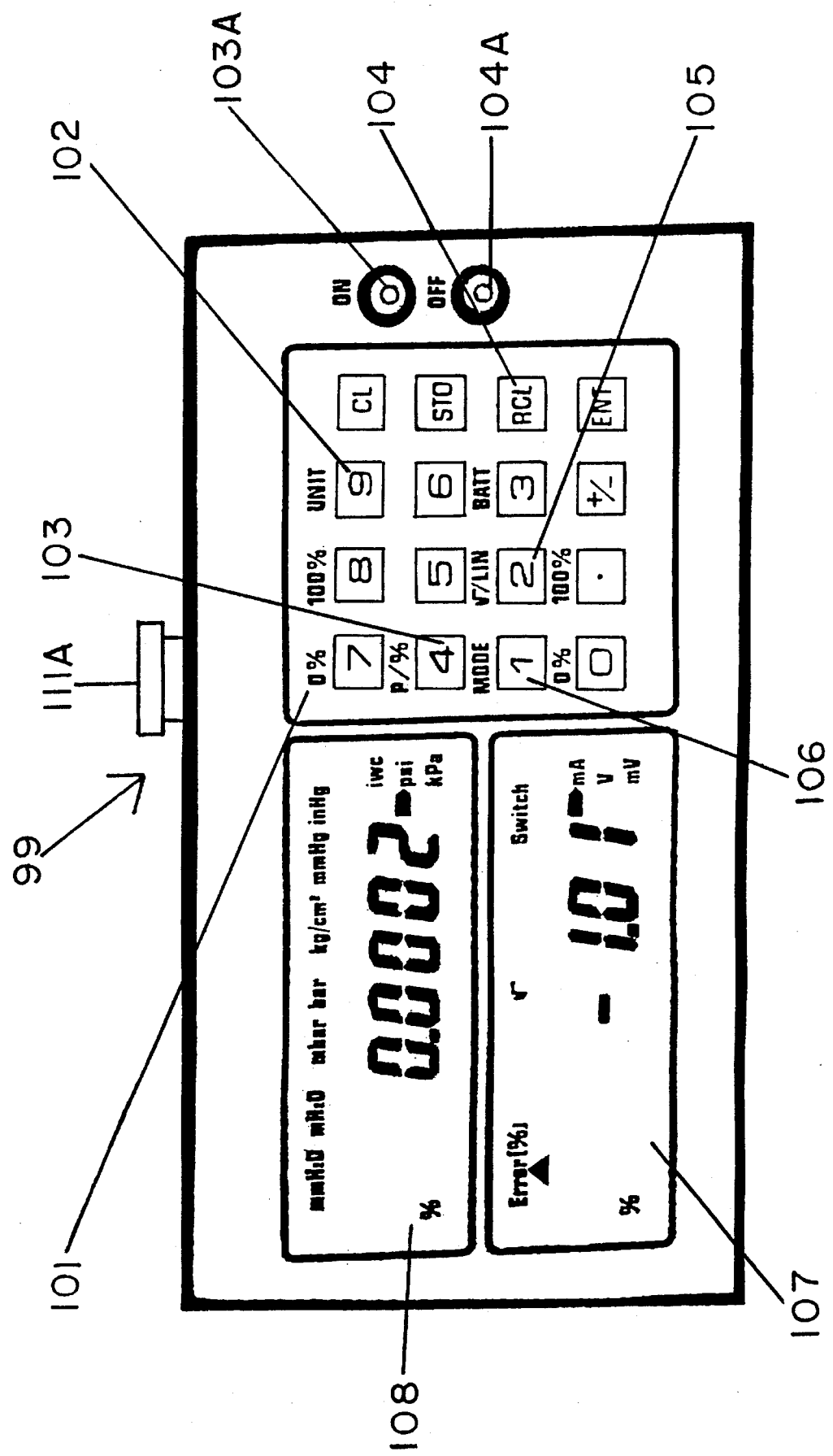
FIG. 12 is a front view of the control panel of a pneumatic calibrator/controller for measuring, monitoring and regulating air pressure in the tires.
Figure 13:
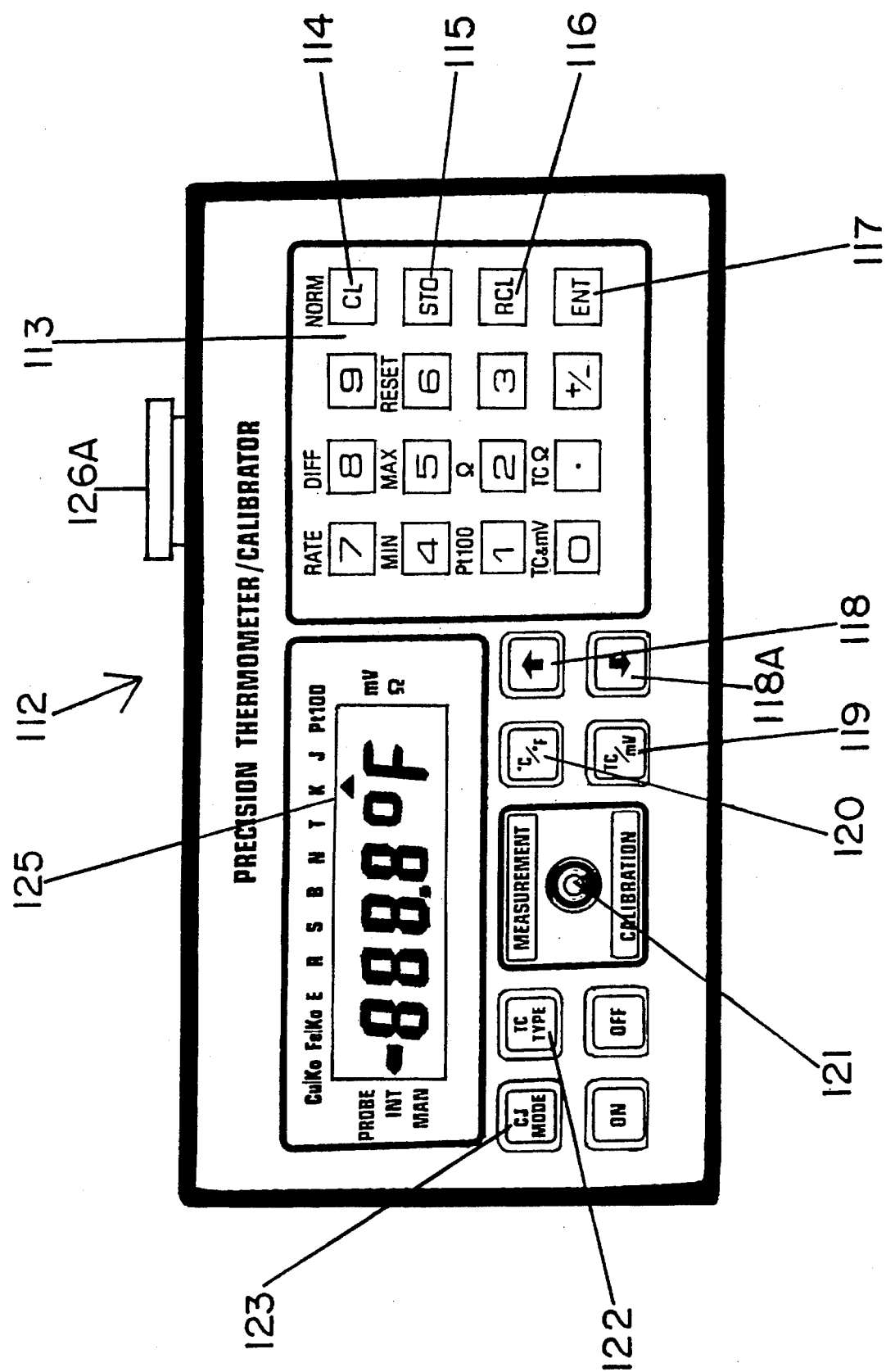
FIG. 13 is a front view of the control panel of a precision thermometer/temperature calibrator for measuring, monitoring and regulating the air temperature in the tires.

The wheel 82 has an outer surface which is normally contained by a tire 32 to form an airtight tire chamber 84. A safety valve 83 which is electronically switched for two-way air flow is disposed between the air lock coupling 83A in the wheel 82 and and in the air lock coupling 83B in the hub 73 and is provided in the outlet air line 40 at the interface of couplings 83A & 83B for preventing air loss from the airtight tire chamber 84 as is shown in FIGS. 3 & 7. In FIGS. 3 & 7, a pressure/temperature sensor 85 is contained in the tire chamber 84 and is fixedly mounted on the wheel 82. The sensor 85 is equipped with a transmitter 87 and an antenna 87A for wireless transmission of pressure information to the pneumatic calibrator 99 as shown in FIG. 12 and for the wireless transmission of temperature information to the thermometer calibrator 125 as shown in FIG. 13. A wire 86 is provided outside of wheel 82 and is in electrical connection with sensor 85 through wheel 82 for a hard wired means of connecting sensor 85 to terminal 54D as is shown in FIGS. 3 & 7 along with a metal conduit 86A fixedly attached to wheel 82 that protects wire 86. An additional electrical path is provided along the inside surface of outlet air line 40 and along the inside surface of wheel 82 via conductor 54C which terminates at a connection 85A disposed between transmitter 87 and wheel 82 as is shown in FIGS. 3 & 7. A second pressure/temperature sensor 85S is fixedly disposed on the interior wall surface of a tire 32 at location L1 and is connected in line with pressure/temperature sensor 85 via a plug P1 and an extension 86E of wire 86 and an extension 54CE of conductor 54C along the inside surface of wheel 82 and along the interior wall surface of tire 32. The hub 73 has a steel spacer 73A allowing conduit 86A to be safely disposed between hub 73 and wheel 82 in FIG. 3. The additional electrical path is provided as a safety back-up connection in case of failure of the wireless transmitter 87 or any of its associated components thereof.

In FIG. 8, a passive rear axle 46 is shown with support shaft fitting 64, bearing support shaft 68 and axial air channel 58 disposed therebetween. The annular ferrofluid seal 38 has a fixed annular magnet 44 fitted about axle 46 and has adjacent flanking annular pole blocks 48 and a ferrofluid 50 located between a pole block 48 and the support shaft fitting 64 and between another pole block 48 and the bearing support shaft 68, thereby forming an annular chamber 52 between the pole blocks 48 about the vehicle axle 46. Axial ribs 70 are disposed about axle 46 and are an integral part of support shaft fitting 64 and are disposed in annular chamber 52 which is in connection with fixed annular magnet 44. Carbon/graphite seals 54 flank ferrofluid seals 38 protecting them from dirt and contamination and are electrical conductors via a conductor 54C etched on the surface of bearing support shaft 68, in a hole 54G in hub 73 adjacent terminal 54E, in a hole 54F adjacent terminal 54D, on a surface 54H of hub 73 and on the inside surface of outlet air line 40. A safety valve 42 is disposed in outlet air line 40 and is in connection with annular air chamber 52 and channel 58 through a passage 56 formed in annular magnet 44. Seal fitting 55 holds seal 54 in place. Bearings 74 are disposed about axle 46.

In FIG. 9, an active front steered axle is shown which is of the constant velocity drive type with a second reduction gear at 61B according to Kirkstall. An inlet air line 36 feeds through a pivoting assembly 61A which is coaxial with the stub axle 74B and is fixedly secured by a cap 59A and bracket 59B. The pole block 48A is fixedly secured to cap 59A, magnet 44P is fixedly secured to pole blocks 48A and 48B and all of which are not active. A hole 44H is formed in magnet 44P for air passage to annular air chamber 52 and axial channels 58. The active components of pivoting assembly 61A during steering motion are seal 54P, bearing support shaft 68P, support shaft fitting 64P and ferrofluid seals 38. A bearing support shaft extension 68A and support shaft fittng extension 64A link the pivoting assembly 61A with bearing support shaft 68 and support shaft fitting 64 about axle 46. The sealing assembly about axle 46 further comprises shaft 68B, shaft fitting 64B, pole blocks 48 and magnet 44 with ferrofluid seals 38 between pole blocks 48 and shafts 68B and shaft fitting 64B. An outlet air line 40 is in line with a passage 56 formed in the magnet 44. Carbon/graphite seals 54 flank ferrfluid seals 38 to protect them from dirt and contamination and are electrical conductors via conductor 54C etched on the inside surface of the bearing support shaft 68P, bearing support shaft extension 68A, bearing support shaft 68, shaft 68B and on the surface of a hole 54f in the hub 73. A terminal 54D is located at the opening of hole 54F in hub 73. A terminal 54E is located on cap 59A where a hole 54G in cap 59A has a conductor 54C etched on its inside surface that makes contact with seal 54P which is disposed between cap 59A and bearing support shaft 68P and is in a concentric orientation with the stub axle 74B. This allows a similar dynamic electrical connection to a valve 83 and a pressure/temperature sensor 85 in a tire chamber 84 as is shown in FIG. 3 and FIG. 7. A signal may also be sent to the dash board by means of a radio transmitter 87 in connection with a sensor 85 as is shown in FIG. 3 and FIG. 7. Seal fitting 55 holds the carbon graphite seal 54 in place about axle 46. An inlet safety valve 42 is disposed in inlet air line 36 of pivoting assembly 61A and is in connection with annular air chamber 52 by means of the passage 44H formed in the magnet 44, pole block 48A and cap 59A. An outlet safety valve 42 is disposed in the outlet air line 40 and is in connection with air chamber 52 by means of a passage 56 formed in magnet 44, magnetic housing 59 and hole 73H formed in hub 73.

In FIG. 10, a sealing assembly for cancelling internal magnetic flux leakage and external stray magnetic flux comprises annular magnets 44R and 44L which flank pole blocks 48, 48L and 48R with magnet 44 also flanking pole blocks 48. Magnet pair 44L and 44 have their north poles flanking pole block 48. Magnet pair 44R and 44 have their south poles flanking another pole block 48. An annular magnetic metal housing 59 contains the sealing assembly 43. A magnetic shield sleeve 39 is disposed about axle 46 to prevent magnetic flux lines 60 from entering axle 46. A magnetic shield cover 41 further isolates magnetic metal housing 59 from attracting metal debris from the environment. Ferrofluid seals 38 are disposed between pole blocks 48 and bearing support shaft 68 and support shaft fitting 64 and air channels 58 being between shaft 68 and fitting 64. Carbon/graphite seals 54 flank ferrofluid seals 38 to protect them from dirt and contamination and are electrical conductors via conductor 54C etched on the inside surface of the bearing support shaft and on the surface of a hole 54f in a hub 73 and a hole 54G in bearing housing 63 and a terminal 54E being provided at the opening of hole 54G and a terminal 54D being provided at hole 54F in hub 73 similar to that shown in FIGS. 3, 7, 8 & 9 although not shown in FIG. 10. This allows a dynamic electrical connection to a valve 83 and a pressure/temperature sensor 85 in a tire chamber 84 as shown in FIGS. 3 & 7. A signal may also be sent to the dash board by means of a radio transmitter 87 in connection with sensor 85 as is shown in FIGS. 3 & 7. Seal fitting 55 holds the carbon graphite seal 54 in place and spacer 57 is disposed between seal fittings 55 and magnets 44L and 44R for support. Inlet air line 36 passes through magnet 44, magnetic metal housing 59, magnetic shield cover 41 and is secured by tube fitting 47. Annular chambers 52L and 52R are between magnet 44L and bearing support shaft 68 and between magnet 44R and support shaft fitting 64 respectively. Bearing 74, bearing housing 63 and lubricant 74A are in a similar location as shown in FIG. 3. Shaft stop 79 is secured to axle 46 by means of screw 79A. Axle cover 63A covers shaft stop 79 and seal fitting 55.

In FIG. 11, a double seal arrangement can be incorporated in such areas that may have two tires side by side. Typically this relates to trucks which have multiple tires and wheels on the trailer portion of the vehicle or on airplanes where each landing gear assembly under each wing has two pairs of tires and wheels and where the landing gear assembly at the nose of the airplane has one pair of tires and wheels. There is usually an inner tire and an outer tire and the seal assembly 43A is disposed between them. An air outlet 1R would then feed compressed air to the inner tire and an air outlet 1L would feed the outer tire of the tire pair. Inlet air lines 36 are shown with safety valves 42. Assembly 43A comprises an axle 46, a support shaft fitting 64 and a bearing support shaft 68 about said axle 46. Ferrofluid seals 38 are between bearing support shaft 68, annular pole tips 68A and pole blocks 48. Carbon/graphite seals 54 flank ferrofluid seals 38 and are held in place by seal fittings 55. Bearings 74 flank pole blocks 48. Static ring seals 51 are between pole blocks 48 and metal housing 59 to prevent any air that may pass between pole blocks 48 and magnet 44 in the event of a separation of these two components or of minute air seepage between them. This will probably never occur but the static seals are there as a precaution. The seals 51 may be eliminated when the pole blocks 48 and magnet 44 are made from a single solid metal block which is not shown in FIG. 11. A magnetic shield sleeve 39 is disposed between axle 46 and support shaft fitting 64. Annular air chamber 52 is in connection with inlet air line 36 by means of a passage 56 formed in magnet 44 and with air outlets 1L and 1R by means of channels 58.

In FIG. 12 a pneumatic calibrator/controller 99 having a control panel 100 comprises a numeric keyboard 101 with pressure selection key 102, display mode key 103, memory key 104, transmitter output key 105, a second display mode key 106, a six digit LCD display 107 for error and electrical readings and a six digit LCD display 108 for pressure readings. A pressure chart 109, an electrical chart 110 and a product chart 111 are also indicated in FIG. 12A. An on switch 103A and an off switch 104A are indicated. A communication port 111A is provided for interfacing the pneumatic calibrator/controller with a computer and a computer controlled pre-programmed microprocessor in a vehicle.

In FIG. 13 a precision thermometer/temperature calibrator 125 having a control panel 112 comprises a numeric keypad 113, a clear display key 114, a memory key 115, a recall key 116, an output key 117, an increment up key 118, an increment down key 118A, a thermocouple select key 119, a units key 120, a mode switch 121, a thermocouple type key 122 and a cold junction compensation mode key 123 and a large six digit LCD display 125. An input/output range chart in FIG. 13A. A communication port 126A is provided for interfacing the precision thermometer/temperature calibrator with a computer and a computer controlled microprocessor in a vehicle.

Figure 14:
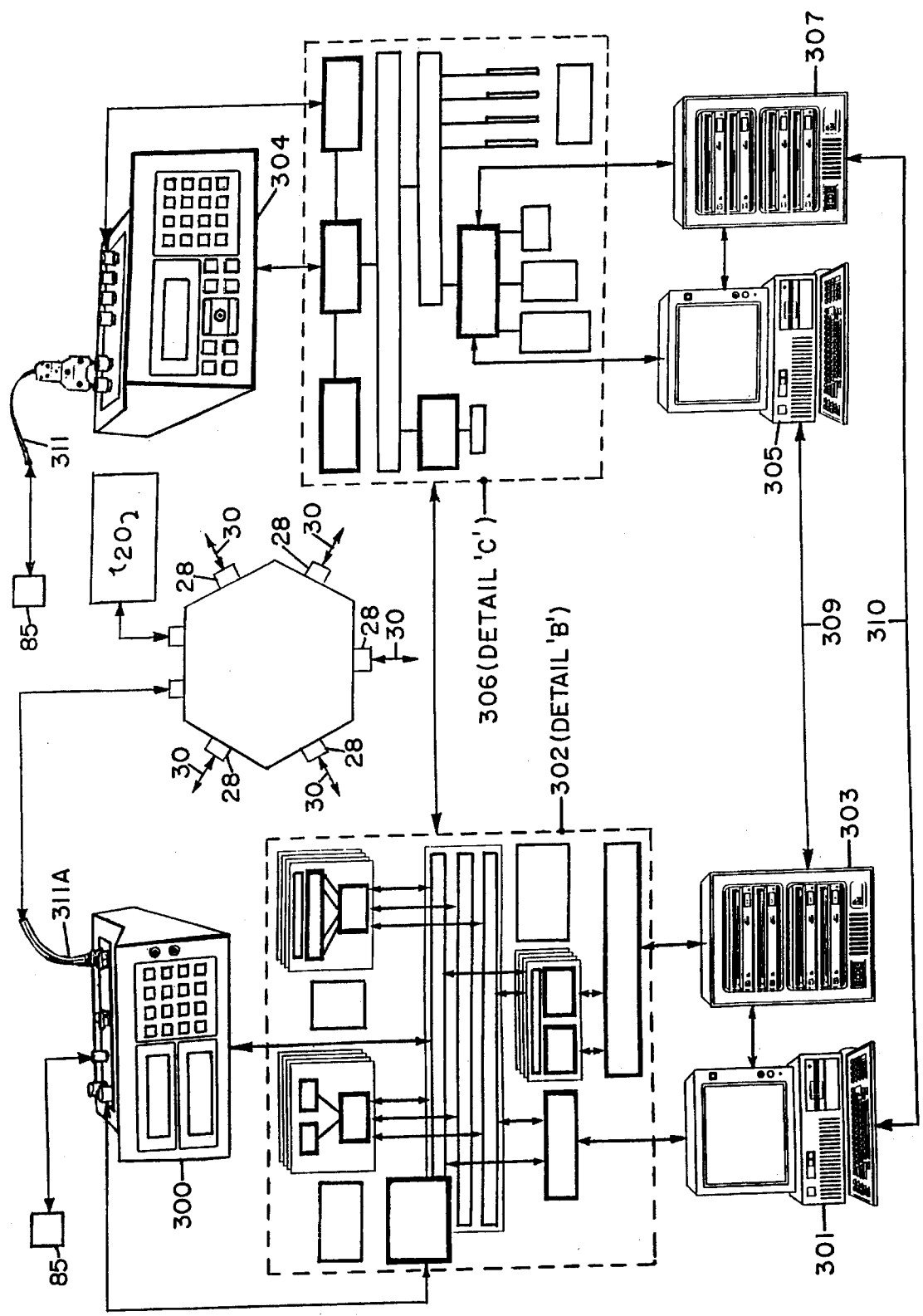
FIG. 14 is a schematic view of the pneumatic calibrator/controller integrated with a computer and a computer controlled pre-programmed microprocessor and a computer data storage and data retrieval means for processing pneumatic and pressure information and is also a schematic view of the precision thermometer/temperature calibrator integrated with a computer and a computer controlled pre-programmed microprocessor and a computer data storage and data retrieval means for processing temperature information.

FIGS. 14–16 are schematic views of the pneumatic calibrator/controller (300) integrated and in connection with a computer (301) and a computer controlled pre-programmed microprocessor (302) and a computer data storage and data retrieval means (303) for processing pneumatic and pressure information and is in connection at pressure port 311A with a distributor (26) having a plurality of valves (28) and an air compressor (20) is in connection with distributor (26) and a pressure/temperature sensor (85) is in connection with calibrator/controller (300). FIG. 14 also shows a schematic view of the precision thermometer/temperature calibrator (304) integrated with a computer (305) and a computer controlled pre-programmed microprocessor (306) and a computer data storage and data retrieval means (307) for processing temperature information and is in connection with a pressure/temperature sensor (85) connected with a K type thermocouple (311) connected to calibrator (304). A data channel (308) connects the microprocessor (302) with microprocessor (306) for data transfer and communication functions. A data channel (309) connects the data storage and retrieval means (303) with computer (305) and a data channel (310) connects computer (301) with the data storage and retrieval means (307) for data transfer and communication functions.

In FIGS. 17-18 a computer program 127A and 127B is shown that allows the calculation of varying air pressure, volume of a tire chamber and its air and surface temperature. It also allows the physical properties of a gas, (i.e. the number of air molecules), to be changed and heat to be added to or removed from the air in a tire chamber. This computer program is pre-programmed into a computer and and a computer controlled microprocessor for the control of air pressure, tire chamber volume and tire air and surface temperature. A typical computer screen display 127C is shown in FIG. 19. 127C shows a list of the variables to be used in the computation.

Means for sensing the air pressure in the tire are provided as are means for sensing the air temperature in the tire and the tire surface temperature and a microprocessor means for calculating a tire pressure and air temperature in a tire and a tire surface temperature. At high speeds tire temperature increases and is an indicator of the condition and state of the tire. Although an increase in tire air temperature also increases tire air pressure, at high speeds it is well known in the art that this increase is benefical because it tends to make the tire run cooler. At this time there is no test data in the art to firmly support this claim. It is merely a commonly accepted norm.

The sensing means for monitoring tire air pressure and tire temperature may be by a sensor such as disclosed in U.S. Pat. No. 5,071,259, the disclosure of which is incorporated by reference in its entirety.

Means for displaying the sensed and adjusted pressure as well as the internal air temperature in the tire and the tire surface temperature in a numeric display are preferably available to the vehicle operator as are means for selecting a preset tire pressure value and displaying the preset value in a numeric display. These display means and selecting means preferably comprise an LED display with a numeric keypad to select the tire pressure. A traditional analog indicator gauge may be used to replace the LED display. A tire selection code may be used to select the tire or tires to be pressurized. It may be that the two tires on front and rear axles should be set at the same time so that there is no unequal tire balance. An unlock/lock code may be desired to prevent tampering with the pressure settings.

The system uses a microprocessor means for comparing the sensed and adjusted air pressure of a tire with the preset tire pressure value and for activating a distributor valve element to deliver air to a selected tire when the comparing means determines that the sensed and adjusted air pressure is below a preset value. Means for deactivating the delivering means to stop the delivery of air to the selected tire when the comparing means determines that the sensed and adjusted air pressure is at a preset value are also provided.

In one embodiment, the system further comprises remotely controlled means for venting air from a tire when the tire pressure exceeds a preselected value. This may be achieved by making valve 83 remotely controllable by the microprocessor selecting means so that the tire air is vented to the atmosphere or back into the tire inflation system when instructed by the controller.

The invention is usable on all types of vehicles having pneumatic tires, including automobiles, trucks, trailers, aircraft, spacecraft, sub-oceanic vehicles, etc.

Having now described several embodiments in accordance with the invention, its advantages may be appreciated.

Other embodiments and variations of the invention may be made without departing from the scope of the following claims.

I claim:

1. An automatic tire pressure control system for a vehicle, comprising:

means for compressing air;

means for delivering said compressed air to a tire of said vehicle;

first sensing means for sensing the air pressure in said tire;

first comparing means for comparing the sensed tire air pressure with at least a first preset value;

second sensing means for sensing the air temperature in said tire;

second comparing means for comparing said sensed tire air temperature with at least a second preset value;

third sensing means for sensing a surface temperature of said tire;

third comparing means for comparing said sensed tire surface temperature with at least a third preset value;

means for activating the delivering means to deliver air to and inflate said tire when said first comparing means determines that said sensed tire air pressure is below said first preset value;

means for deactivating the delivering means to stop the delivery of air to and inflation of said tire when said first comparing means determines that said sensed tire air pressure is at said first preset value;

means for remotely controlled venting of air from said tire;

means for activating said venting means to vent air from and deflate said tire when said first comparing means determines that said sensed tire air pressure is above said first preset value;

means for deactivating said venting means to stop the venting of air from and deflation of said tire when said first comparing means determines that said sensed tire air pressure is at said first preset value;

said means for compressing air comprising an air compressor, a compressed air reservoir connected to said air compressor to receive and store said compressed air, and a regulator to regulate air pressure in said reservoir;

means for calculating said sensed tire air pressure;

means for displaying said sensed tire air pressure in a first numeric display;

means for calculating said sensed tire air temperature;

means for calculating said sensed tire surface temperature;

means for displaying said sensed tire air temperature in a second numeric display;

means for displaying said sensed tire surface temperature in said second numeric display;

means for selecting said first, second and third preset values and displaying said first, second and third preset values in said numeric displays;

said delivering means comprising a distributor having a plurality of valve elements each having an air line leading to each tire of said vehicle, whereby said distributor selectively distribute said compressed air to a selected tire;

means for activating said plurality of valve elements to deliver air to and inflate said selected tire when said first comparing means determines that said sensed tire air pressure is below said first preset value;

means for deactivating said plurality of valve elements to stop the delivery of air to and inflation of said selected tire when said comparing means determines that said sensed tire air pressure is at said first preset value;

means for activating said plurality of valve elements to vent air from and deflate said selected tire when said first comparing means determines that said sensed tire air pressure is above said first preset value;

said air compressor having an outlet air line connected to said distributor;

said compressed air reservoir having an outlet air line connected to said distributor;

an inlet air line connecting said distributor to said compressor;

an inlet air line connecting said distributor to said compressed air reservoir;

each said air line being connected to each said tire by a sealing assembly comprising:

a first inlet air line in connection with said distributor and a metal housing of said sealing assembly;

two spaced annular means for sealing located around an axle whereby an annular air chamber is located about said axle with said inlet air line operably connected therewith;

said annular air chamber being capable of sustaining and containing pressurized air without leakage;

an outlet air line leading to a tire wheel, said wheel having an outer surface which is normally contained by a tire to form an airtight tire chamber;

a safety valve disposed in and in connection with said first inlet air line and being operable to permit passage of air only upon certain established conditions;

a remotely controlled two-way safety valve for air flow to said tire or air flow from said tire, disposed in said outlet air line and interfacing an air lock coupling in said wheel and said air lock coupling in a hub and being operable to permit passage of air only upon said certain established conditions;

said safety valve for preventing air loss from said airtight tire chamber and being disposed in said outlet air line and in connection with said tire wheel and interfacing said airtight tire chamber and being operable to permit passage of air only upon said certain established conditions;

an annular ferrofluid seal located to provide said annular air chamber about said axle, said annular air chamber being in connection with said safety valve of said inlet air line;

an annular sealing means comprising said annular ferrofluid seal having a fixed annular magnet fitted about said axle and flanking annular pole blocks and annular pole tips and a ferrofluid located between said annular pole blocks and the axle, thereby forming said annular air chamber between said pole blocks about the axle, said annular air chamber being in connection with said first inlet air line either through channels extending along the axle or through a passage formed in said fixed annular magnet and said metal housing, and further comprising annular carbon graphite seals operable as mechanical seals for preventing contaminants from entering said annular ferrofluid seal and as electrical conductors flanking said annular pole blocks and ring seals disposed about the outside perimeter of said annular pole blocks for the prevention of air leakage between said magnet and said pole blocks;

said mechanical seals located longitudinally outwardly and inwardly of said ferrofluid seals;

a plurality of air channels extending from said annular chamber longitudinally about the axle;

a bearing support shaft being fitted onto and in connection with a support shaft fitting;

said bearing support shaft and said support shaft fitting fitted onto and in connection with said axle;

said bearing support shaft and said support shaft fitting with said plurality of air channels therebetween about the axle;

a shaft stop or a pair of shaft stops flanking said sealing assembly and being out of the air flow path and being about said axle;

said shaft stop or said pair of shaft stops flanking said sealing assembly and being in the air flow path and being provided with air cavities being in connection with said plurality of air channels and being about said axle;

said bearing operating on the outer radial surface of and in rolling connection with said bearing support shaft;

an outlet air line leading from said plurality of air channels to said tire wheel, said wheel having said outer surface which is normally contained by said tire to form an airtight tire chamber;

an outer radial surface of said support shaft fitting having a plurality of axial ribs with wider channels therebetween; and an inner radial surface of said bearing support shaft having a plurality of axial ribs with wider channels therebetween; whereby, said outer radial surface of said support shaft fitting with said plurality of axial ribs fits with substantial clearance in said wider channels of said inner radial surface of said bearing support shaft; and said inner radial surface of said bearing support shaft with said plurality of axial ribs fits with substantial clearance in said wider channels of said outer radial surface of said support shaft fitting; whereby, said plurality of axial ribs on said outer radial surface of said support shaft fitting and said plurality of axial ribs on said inner radial surface of said bearing support shaft, interlock and are supported at a plurality of bearing force transfer points located in a central portion of said wider channels in said support shaft fitting and in said bearing support shaft leaving a plurality of air channels therebetween, said plurality of air channels extending axially with said axle for the passage of compressed air to said tire or the venting of air from said tire;

said outer radial surface of said support shaft fitting and said inner radial surface of said bearing support shaft being curvilinear in profile, where said curvilinear profile minimizes bending stresses and potential for fracturing at said outer radial surface of said support shaft fitting and said inner radial surface of said bearing support shaft;

annular pole tips being in connection with or formable on said bearing support shaft or said support shaft fitting or said annular pole blocks or said axle;

an annular clearance gap with a ferrofluid filled therein;

said annular clearance gap disposed between said annular pole blocks and said annular pole tips in connection with or formable on said bearing support shaft or said support shaft fitting or said axle and between said annular pole tips in connection with or formable on said annular pole blocks and said bearing support shaft or said support shaft fitting or said axle;

an annular magnetic flux generated from said fixed annular magnet fitted about said axle having a continuous magnetic flux path through said fixed annular magnet and said annular pole blocks and said ferrofluid in said annular clearance gap and said annular pole tips and said bearing support shaft and said support shaft fitting and said axle, where said annular magnetic flux operates in said continuous magnetic flux path and is concentrically disposed about and within said axle;

said outer radial surface of said support shaft fitting and said inner radial surface of said bearing support shaft being highly polished to reduce air friction, whereby said reduced air friction further increases said air flow capacity in said plurality of air channels and further reduces the inflation time, and said outer radial surface of said support shaft fitting and said inner radial surface of said bearing support shaft are provided with a low friction surface coating to non-bearing portions of said surfaces to reduce air friction, whereby said reduced air friction further increases said air flow capacity in said plurality of air channels and further reduces said inflation times.

2. An automatic tire pressure control system for a vehicle in accordance with claim 1, wherein said air compressor comprises an electrically operated air compressor connected to an electrical system provided in said vehicle, or comprises a mechanically operated air compressor operated by an endless belt, said belt being mechanically connected with a motor in said vehicle.

3. An automatic tire pressure control system for a vehicle in accordance with claim 1, wherein said ferrofluid seals exhibit zero air leakage, and whereby said zero air leakage is defined by a standard of less than $1.0 \times 10-8$ standard cubic centimeters of helium per second, thereby conforming to an industry standard in said defintion for said zero air leakage; and further wherein, said ferrofluid seal is nonwearing and of extremely low friction during operation;

and whereby, said ferrofluid seals operate in gaseous atmosphere under pressure or vacuum without leakage;

and operate in liquid environment under pressure or vacuum without leakage.

4. An automatic tire pressure control system for a vehicle in accordance with claim 1, wherein said ferrofluid consists of a carrier fluid and said carrier fluid contains ultramicroscopic particles of a magnetic solid and said magnetic solid being a magnetite, said magnetite being colloidally suspended and being stabilized by physiochemical means, and said ultramicroscopic particles being coated with a coating and said coating prevents flocculation of said ultramicroscopic particles under the influence of a magnetic field and said coated ultramicroscopic particles randomly collide with the molecules of said carrier liquid, and said coated ultramicroscopic particles are kept in said colloidal suspension for an indefinite period of time, said ferrofluid is electrically nonconductive and said ferrofluid is contained in said carrier liquid and said carrier liquid is a fluorocarbon, a hydrocarbon, a polyphenyl ether or an aqueous solution and said ferrofluid is a magnetic fluid and said ferrofluid has identical chemical and mechanical characteristics as said carrier liquid in which said coated ultramicroscopic particles are said colloidally suspended and said carrier fluid having a saturation magnetization range from 200 to 450 gauss.

5. An automatic tire pressure control system for a vehicle in accordance with claim 1, a double sealing assembly further comprises;

a pair of fixed annular magnets whose polarities are in an attracting orientation;

a pair of annular pole blocks and annular pole tips and said bearing between said fixed annular magnets;

said pair of annular pole blocks and said annular pole tips and said bearing flanking one of said annular pole blocks;

said pair of annular pole blocks and said annular pole tips and said bearing flanking another of said annular pole blocks;

said ferrofluid seal between said annular pole blocks and said annular pole tips of said support shaft fitting where said support shaft fitting acts to support said bearing between said fixed annular magnets;

said ferrofluid seal between said annular pole tips of said bearing support shaft and said annular pole blocks;

said mechanical seals located inwardly and outwardly of said ferrofluid seals;

ring seals disposed about said pole blocks;

said pair of air inlets in said magnetic metal housing and said passage formed in said pair of fixed annular magnets;

said annular air chamber in connection with each said air inlet;

a plurality of air channels in connection with each said annular air chamber;

said bearing support shaft and said support shaft fitting with said plurality of air channels therebetween about the axle;

an air outlet in connection with said plurality of air channels feeding an outer tire wheel;

an air outlet in connection with another said plurality of air channels feeding an inner tire wheel;

a magnetic shield cover disposed about said magnetic metal housing and a magnetic shield sleeve disposed between said support shaft fitting and said axle.

6. An automatic tire pressure control system for a vehicle in accordance with claim 1, comprising:

a pneumatic calibrating means and a pneumatic controlling means for measuring and monitoring and regulating the tire air pressure and being in connection with said air delivery means and further being interfaced with and in connection with a computer and a computer controlled pre-programmed microprocessor means being interfaced with and in connection with a computer data storage means and a computer data retrieval means for processing pneumatic and pressure information and being disposed in a said vehicle;

a precision thermometer means and a temperature calibrating means for measuring and monitoring and regulating the tire air temperature and said tire surface temperature and being in connection with said air delivery means and further being interfaced with and in connection with said computer and said computer controlled pre-programmed microprocessor means being interfaced with and in connection with said computer data storage means and said computer data retrieval means for processing temperature information and being disposed in said vehicle;

said computer and said computer controlled pre-programmed microprocessor means for automatically calculating and comparing said sensed tire air pressure and said sensed tire air temperature and said sensed tire surface temperature with the first preset tire air pressure value and the second preset tire air temperature value and the third preset tire surface temperature value respectively and displaying the calculated and compared tire air pressure value and the calculated and compared tire air temperature value and the calculated and compared tire surface temperature value with a sensed tire air pressure value and a sensed tire air temperature value and a sensed tire surface temperature value and said first preset tire air pressure value and said second preset tire air temperature value and said third preset tire surface temperature value respectively in said second numeric display;

said computer and said computer controlled pre-programmed microprocessor means for automatically activating said air delivering means and said valve element to deliver air to and inflate said selected tire when said calculating and comparing means determines that said sensed air pressure in said tire is below said first preset value;

said computer and said computer controlled pre-programmed microprocessor means for automatically deactivating said air delivering means and said valve element to stop the delivery of air to and stop the inflation of said selected tire when said calculating and comparing means determines that said sensed air pressure in said tire is at said first preset value;

said computer and said computer controlled pre-programmed microprocessor means for automatically activating said remotely controlled air venting means to vent air from and deflate said selected tire when said calculating and comparing means determines that said sensed air pressure in said tire is above said first preset value;

said computer and said computer controlled pre-programmed microprocessor means for automatically deactivating said remotely controlled air venting means to stop the venting of air from and stop the deflation of said selected tire when said calculating and comparing means determines that said sensed air pressure in said tire is at said preset value;

said computer storage and retrieval means for automatically storing and retrieving said sensed tire air pressure value and said sensed tire air temperature value and said sensed tire surface temperature value and said first preset tire air pressure value and said second preset tire air temperature value and said third preset tire surface temperature value and said calculated and compared tire air pressure value and said calculated and compared tire air temperature value and said calculated and compared tire surface temperature value and being interfaced and operative with said computer and said computer controlled pre-programmed microprocessor means and said computer data storage means and said computer data retrieval means and displaying said sensed tire air pressure value and said first preset tire pressure value and said second preset tire air temperature value and said third preset tire surface temperature value and said calculated and compared tire air pressure value and said calculated and compared tire air temperature value and said calculated and compared tire surface temperature value in said second numeric display;

said computer and said computer controlled pre-programmed microprocessor means and said computer data storage means and said computer data retrieval means being operatively connected with a pneumatic calibrator/controller disposed in said vehicle;

a second computer and a second computer controlled pre-programmed microprocessor means and a second computer data storage means and a second computer data retrieval means being operatively connected with a precision thermometer/temperature calibrator disposed in said vehicle;

where, said computer and said computer controlled pre-programmed microprocessor means and said computer data storage means and said computer data retrieval means operatively connected with said pneumatic calibrator/controller disposed in said vehicle is further operatively connected with said second computer and said second computer controlled pre-programmed microprocessor means and said second computer data storage means and said second computer data retrieval means operatively connected with the precision thermometer/temperature calibrator disposed in said vehicle.

* * * * *